US012573326B2

(12) United States Patent
Lee et al.

(10) Patent No.: US 12,573,326 B2
(45) Date of Patent: Mar. 10, 2026

(54) DISPLAY APPARATUS AND OPERATING METHOD OF THE SAME

(71) Applicant: Samsung Electronics Co., Ltd., Suwon-si (KR)

(72) Inventors: Kyuheon Lee, Suwon-si (KR); Daehyun Park, Suwon-si (KR); Jaein Yoo, Suwon-si (KR); Jihyeok Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/068,688

(22) Filed: Mar. 3, 2025

(65) Prior Publication Data

US 2025/0299608 A1 Sep. 25, 2025

Related U.S. Application Data

(63) Continuation of application No. PCT/KR2025/099232, filed on Feb. 4, 2025.

(30) Foreign Application Priority Data

Mar. 25, 2024 (KR) ........................ 10-2024-0040544

(51) Int. Cl.
*G09G 3/20* (2006.01)

(52) U.S. Cl.
CPC ....... *G09G 3/20* (2013.01); *G09G 2320/0626* (2013.01); *G09G 2330/021* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 9,035,974 | B2 | 5/2015 | Choi et al. |
| 10,816,800 | B2 | 10/2020 | Kim et al. |

(Continued)

FOREIGN PATENT DOCUMENTS

| | | | |
|---|---|---|---|
| CN | 116781823 | A | 9/2023 |
| KR | 101460041 | B1 | 11/2014 |

(Continued)

OTHER PUBLICATIONS

Search Report and Written Opinion dated May 7, 2025 issued in International Patent Application No. PCT/KR2025/099232.

*Primary Examiner* — Aneeta Yodichkas
(74) *Attorney, Agent, or Firm* — Nixon & Vanderhye, P.C.

(57) ABSTRACT

Provided are a display apparatus and an operating method thereof. The display apparatus includes: a display, memory, and at least one processor, comprising processing circuitry, individually and/or collectively, configured to: store, in the memory, image quality information about one or more test images and a sensitivity level for the one or more test images, obtain an input image and image quality information about the input image, identify whether the image quality information about the input image corresponds to image quality information about at least one test image, based on the image quality information about the input image corresponding to the image quality information about the at least one test image, generate a driving signal for adjusting brightness of the input image, based on a sensitivity level for the at least one test image, and control the display through the generated driving signal.

20 Claims, 19 Drawing Sheets

(56) References Cited

U.S. PATENT DOCUMENTS

| | | | |
|---|---|---|---|
| 11,120,771 | B2 | 9/2021 | Callway et al. |
| 12,020,628 | B2 | 6/2024 | Oh et al. |
| 2018/0241925 | A1 | 8/2018 | Suzuki et al. |

FOREIGN PATENT DOCUMENTS

| | | | |
|---|---|---|---|
| KR | 10-1631077 | | 6/2016 |
| KR | 10-2018-0074562 | | 7/2018 |
| KR | 102038984 | B1 | 10/2019 |
| KR | 102136873 | B1 | 7/2020 |
| KR | 10-2021-0110630 | | 9/2021 |
| KR | 10-2022-0103551 | | 7/2022 |
| KR | 102489905 | B1 | 1/2023 |

FIG. 6

610

| | SENSITIVITY LEVEL "BOTTOM" | SENSITIVITY LEVEL "TOP" |
|---|---|---|
| GRAYSCALE ITEM | GRAYSCALE "BOTTOM" | GRAYSCALE "TOP" |
| NUMBER-OF-OBJECTS ITEM | NUMBER OF OBJECTS "TOP" | NUMBER OF OBJECTS "BOTTOM" |
| NUMBER-OF-COLORS ITEM | NUMBER OF COLORS "TOP" | NUMBER OF COLORS "BOTTOM" |
| EDGE PROPORTION ITEM | EDGE PROPORTION "TOP" | EDGE PROPORTION "BOTTOM" |

620

| SENSITIVITY LEVEL "BOTTOM" | SENSITIVITY LEVEL "TOP" |
|---|---|
| GRAYSCALE "BOTTOM", NUMBER OF OBJECTS "TOP" NUMBER OF COLORS "TOP", EDGE PROPORTION "TOP" | GRAYSCALE "TOP", NUMBER OF OBJECTS "BOTTOM" NUMBER OF COLORS "BOTTOM", EDGE PROPORTION "BOTTOM" |
| GRAYSCALE "INTERMEDIATE", NUMBER OF OBJECTS "BOTTOM" NUMBER OF COLORS "TOP", EDGE PROPORTION "TOP" | GRAYSCALE "INTERMEDIATE", NUMBER OF OBJECTS "TOP" NUMBER OF COLORS "BOTTOM", EDGE PROPORTION "BOTTOM" |

610

| | SENSITIVITY LEVEL “BOTTOM” | SENSITIVITY LEVEL “TOP” |
|---|---|---|
| GRAYSCALE ITEM | GRAYSCALE “BOTTOM” | GRAYSCALE “TOP” |
| NUMBER-OF-OBJECTS ITEM | NUMBER OF OBJECTS “TOP” | NUMBER OF OBJECTS “BOTTOM” |
| NUMBER-OF-COLORS ITEM | NUMBER OF COLORS “TOP” | NUMBER OF COLORS “BOTTOM” |
| EDGE PROPORTION ITEM | EDGE PROPORTION “TOP” | EDGE PROPORTION “BOTTOM” |

FIG. 14

1410

POWER SAVING MODE: FIRST INTENSITY

| ITEM / SENSITIVITY LEVEL | GRAYSCALE ITEM | NUMBER-OF-OBJECTS ITEM | NUMBER-OF-COLORS ITEM | EDGE PROPORTION ITEM | BRIGHTNESS ADJUSTMENT |
|---|---|---|---|---|---|
| CASE1 | BOTTOM | BOTTOM | BOTTOM | BOTTOM | DECREASE |
| CASE2 | **BOTTOM** | **TOP** | **TOP** | **TOP** | **DECREASE** |
| CASE3 | TOP | TOP | TOP | TOP | DO NOT DECREASE BRIGHTNESS |

1420

POWER SAVING MODE: THIRD INTENSITY

| ITEM / SENSITIVITY LEVEL | GRAYSCALE ITEM | NUMBER-OF-OBJECTS ITEM | NUMBER-OF-COLORS ITEM | EDGE PROPORTION ITEM | BRIGHTNESS ADJUSTMENT |
|---|---|---|---|---|---|
| CASE1 | BOTTOM | BOTTOM | BOTTOM | BOTTOM | DECREASE |
| CASE2 | **BOTTOM** | **BOTTOM** | **BOTTOM** | **TOP** | **DO NOT DECREASE BRIGHTNESS** |
| CASE3 | TOP | TOP | TOP | TOP | DO NOT DECREASE BRIGHTNESS |

FIG. 16B
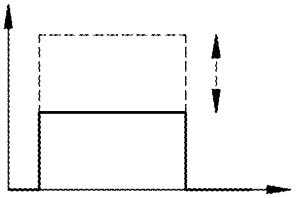
1630
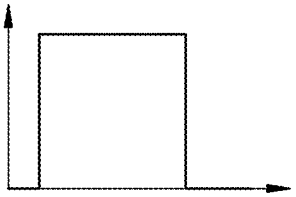
1640

DISPLAY APPARATUS AND OPERATING METHOD OF THE SAME

CROSS-REFERENCE TO RELATED APPLICATIONS

This application is a continuation of International Application No. PCT/KR2025/099232 designating the United States, filed on Feb. 2, 2025, in the Korean Intellectual Property Receiving Office and claiming priority to Korean Patent Application No. 10-2024-0040544, filed on Mar. 25, 2024, in the Korean Intellectual Property Office, the disclosures of each of which are incorporated by reference herein in their entireties.

BACKGROUND

Field

The disclosure relates to a display apparatus and an operating method of the same, and for example, to control of brightness so as to reduce power consumption of a display apparatus.

Description of Related Art

Display apparatuses need to continuously output light while providing information to users and thus have high power consumption compared to other electronic devices. Accordingly, various studies have been conducted to reduce power consumption of display apparatuses.

Dimming technology for adjusting brightness of display screens has been proposed. Dimming technology is a technology for controlling brightness of a backlight configured to emit light or controlling brightness of a self-light emitting display.

Dimming technology may reduce or adjust strength of a driving current to be applied to a light source, based on amplitude of a signal of an image, input to a display apparatus. However, a method of reducing strength of a driving current to be applied to a light source so as to reduce power consumption inevitably causes a decrease in brightness performance of a display apparatus, and thus, a viewing experience of a user may be weakened.

In this regard, studies for decreasing brightness of a display screen so as to reduce power consumption while maintaining a viewing experience of a user are required.

SUMMARY

A display apparatus according to an example embodiment of the disclosure includes: a display, memory storing one or more instructions, and at least one processor, comprising processing circuitry, individually and/or collectively, configured to execute the one or more instructions stored in the memory.

At least one processor, individually and/or collectively, is configured to store, in the memory, image quality information about one or more test images and a sensitivity level indicating sensitivity of a user to a brightness change in the one or more test images.

At least one processor, individually and/or collectively, is configured to obtain an input image and image quality information about the input image.

At least one processor, individually and/or collectively, is configured to identify whether the image quality information about the input image corresponds to image quality information about at least one test image.

At least one processor, individually and/or collectively, is configured to, based on the image quality information about the input image corresponding to the image quality information about the at least one test image, generate a driving signal for adjusting brightness of the input image, based on a sensitivity level for the at least one test image.

At least one processor, individually and/or collectively, is configured to control the display through the generated driving signal.

A method of operating a display apparatus, according to an example embodiment of the disclosure, includes: storing, in memory, image quality information about one or more test images and a sensitivity level indicating sensitivity of a user to a brightness change in the one or more test images, obtaining an input image and image quality information about the input image, identifying whether the image quality information about the input image corresponds to image quality information about at least one test image, based on the image quality information about the input image corresponding to the image quality information about the at least one test image, generating a driving signal for adjusting brightness of the input image, based on a sensitivity level for the at least one test image, controlling a display through the generated driving signal.

According to an example embodiment of the disclosure, provided is a non-transitory computer-readable recording medium having recorded thereon a program which, when executed on a computer, causes an electronic device to perform the method of a display apparatus.

BRIEF DESCRIPTION OF THE DRAWINGS

The above and other aspects, features and advantages of certain embodiments of the present disclosure will be more apparent from the following detailed description, taken in conjunction with the accompanying drawings, in which like reference numerals refer to like elements, and in which:

FIG. 6 includes tables illustrating an example of result data according to a sensitivity test, according to various embodiments;

FIG. 14 is a table illustrating results of a display apparatus adjusting brightness of an input image according to intensity of a power saving mode, according to various embodiments;

FIG. 16B illustrates examples of a pulse amplitude modulation (PAM) signal according to a dimming value, according to various embodiments;

DETAILED DESCRIPTION

Figure 1:
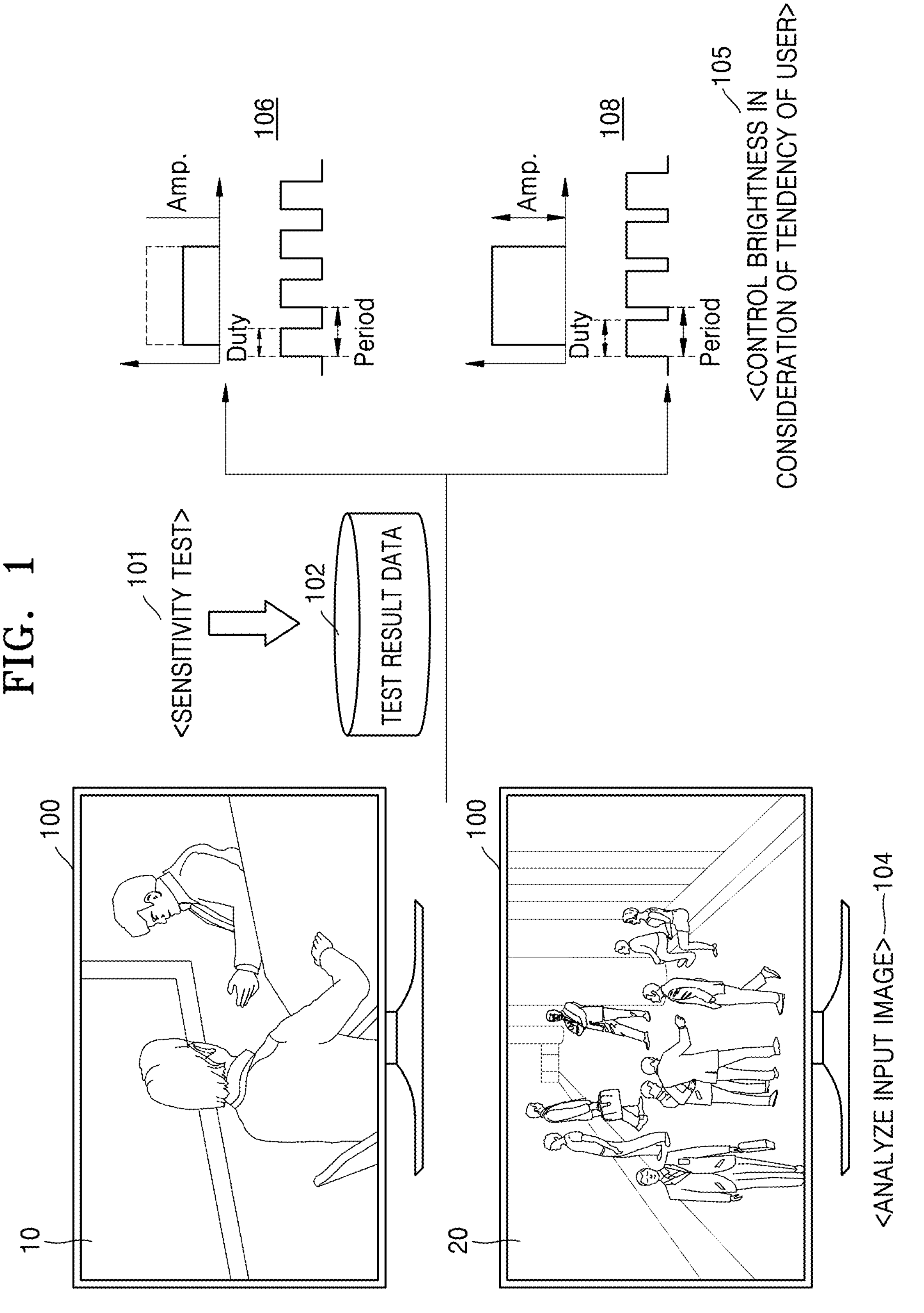
FIG. 1 is a diagram illustrating an example operation in which a display apparatus adjusts brightness of a displayed image, in consideration of a sensitivity tendency of a user, according to various embodiments.

Throughout the disclosure, the expression "at least one of a, b, or c" indicates only a, only b, only c, both a and b, both a and c, both b and c, all of a, b, and c, or variations thereof.

Hereinafter, various example embodiments of the disclosure will be described in greater detail with reference to the accompanying drawings. However, the disclosure may be implemented in various different forms and is not limited to the various example embodiments of the disclosure described herein.

Terms used in the disclosure are described as general terms currently used in consideration of functions described in the disclosure, but the terms may have different meanings according to an intention of one of ordinary skill in the art, precedent cases, or the appearance of new technologies. Thus, the terms used herein should not be interpreted only by its name, but have to be defined based on the meaning of the terms together with the description throughout the disclosure.

The terms used in the disclosure are simply used to describe various embodiments of the disclosure, and are not intended to limit the disclosure.

Throughout the disclosure, when a part is "connected" to another part, the part may not only be "directly connected" to the other part, but may also be "electrically connected" to the other part with another element in between.

"The" and similar directives used in the present disclosure, for example, in the claims, may indicate both singular and plural. Unless there is a clear description of an order of operations describing a method according to the disclosure, the operations described may be performed in a suitable order. The disclosure is not limited by the order of description of the described operations.

The phrases "an embodiment of the disclosure" appearing in various places in this disclosure are not necessarily all referring to the same embodiment of the disclosure.

Various embodiments of the disclosure may be represented by functional block configurations and various processing operations. Some or all of these functional blocks may be implemented by various numbers of hardware and/or software configurations that perform particular functions. For example, the functional blocks of the disclosure may be implemented by one or more microprocessors or by circuit configurations for a certain function. For example, the functional blocks of the disclosure may be implemented in various programming or scripting languages. The functional blocks may be implemented by algorithms executed in one or more processors. In addition, the disclosure may employ general techniques for electronic environment setting, signal processing, and/or data processing. Terms such as "mechanism", "element", "means", and "configuration" may be used widely and are not limited as mechanical and physical configurations.

A connection line or a connection member between components shown in drawings is merely a functional connection and/or a physical or circuit connection. In an actual device, connections between components may be represented by various functional connections, physical connections, or circuit connections that are replaceable or added.

In addition, terms such as "unit", "-or/-er", and "module" described in the disclosure may denote a unit that processes at least one function or operation, which may be implemented in hardware or software, or implemented in a combination of hardware and software.

The term "user" in the disclosure denotes a person using a display apparatus and may include a consumer, an assessor, a viewer, an administrator, and an installation engineer. The term "manufacturer" or "provider" in the disclosure may denote a manufacturer that manufactures a display apparatus and/or a component included in the display apparatus.

In the disclosure, an "image" may include a still image, graphics, a picture, a frame, a moving image including a plurality of consecutive still images, or a video.

In the disclosure, a processor may include various processing circuits and/or a plurality of processors. For example, the term "processor" used herein including claims may include various processing circuits including at least one processor. In at least one processor, one or more processors may be configured to perform various functions described herein individually and/or collectively in a distributed manner. As used herein, a "processor", "at least one processor", or "one or more processors" may be configured to perform several functions. Such terms unlimitedly cover a situation where one processor may perform some of functions and another processor (other processors) may perform another some of the functions, and a situation where a single processor may perform all functions. Also, at least one processor may include a combination of processors configured to perform various functions in a distributed manner. At least one processor may be configured to execute program instructions to achieve or perform various functions.

In the disclosure, a function related to artificial intelligence is performed through a processor and memory. The processor may be configured as one or more processors. The one or more processors may include a general-purpose processor, such as a central processing unit (CPU), an application processor (AP), or a digital signal processor (DSP), a graphic exclusive processor, such as a graphics processing unit (GPU) or a vision processing unit (VPU), or a dedicated artificial intelligence processor such as a neural processing unit (NPU). The one or more processors may control input data to be processed according to predefined operation rules or an artificial intelligence model stored in memory. When the one or more processors are a dedicated artificial intelligence processor, the dedicated artificial intelligence processor may be designed with a hardware structure specialized for processing a specific artificial intelligence model.

In the disclosure, a "neural network" is a representative example of an artificial neural network model simulating brain nerves, and is not limited to an artificial neural network model using a specific algorithm. The neural network may also be referred to as a deep neural network.

In the disclosure, the terms "top" and "bottom" for classifying classes are used for convenience of description, and may be replaced by expressions such as "high" and "low", "bright" and "dark", "large number" and "small number", or "many" and "few".

For example, when a sensitivity level is "bottom", the sensitivity level is low and may be replaced by a "first level". When a sensitivity level is "top", the sensitivity level is high and may be replaced by a "second level". For example, low and high of a sensitivity level may be determined by whether a user has recognized a brightness change in an image.

For example, when a grayscale of an image is "top", the image is bright and the grayscale is high, and the grayscale may be replaced by a "first grayscale". When a grayscale of an image is "bottom", the image is dark and the grayscale is low, and the grayscale may be replaced by a "second grayscale". For example, high and low of a grayscale may be determined by whether a grayscale value is equal to or greater than a threshold value or is less than the threshold value.

For example, when the number of objects is "top", there is a large number of objects in an image and the number of objects may be replaced by a "first number of objects". When the number of objects is "bottom", there is a small number of objects in an image and the number of objects may be replaced by a "second number of objects". For example, a large and small number of objects may be determined by whether the number of objects in an image is equal to or greater than a threshold number or is less than the threshold number.

For example, when the number of colors is "top", a color distribution in an image is diverse and the number of colors in the image is large, and the number of colors may be replaced by a "first number of colors". When the number of colors is "bottom", a color distribution in an image is simple and the number of colors in the image is small, and the number of colors may be replaced by a "second number of colors". For example, a large and small number of colors may be determined by whether the number of colors in an image is equal to or greater than a threshold number or is less than the threshold number.

For example, when an edge proportion is "top", a proportion of edge components in an image is high and the edge proportion may be replaced by a "first edge proportion". When an edge proportion is "bottom", a proportion of edge components in an image is low and the edge proportion may be replaced by a "second edge proportion". For example, high and low of an edge proportion may be determined by whether an edge proportion is equal to or greater than a threshold value or is less than the threshold value.

In the disclosure, classes are divided into "top" and "bottom, but are not limited thereto. For example, to further minutely classify classes, the classes may be divided into "top", "intermediate", and "bottom".

In the disclosure, grayscale information, number-of-objects information, number-of-colors information, and edge proportion information of an image may be each referred to as "image quality information" of the image, and a grayscale item, a number-of-objects item, a number-of-colors item, and an edge proportion item may be each referred to as an "image quality information item" of the image. The number-of-objects information indicates information about the number of objects, and the number-of-colors information indicates information about the number of colors.

FIG. 1 is a diagram illustrating an example operation in which a display apparatus adjusts brightness of a displayed image, in consideration of a sensitivity tendency of a user, according to various embodiments.

Referring to FIG. 1, a display apparatus 100 according to an embodiment of the disclosure may be an apparatus for displaying and providing an image to a user. The display apparatus 100 may be realized in any form including a display. For example, and without limitation, the display apparatus 100 may be realized in various forms, such as a television (TV), a digital signage, a projector, a mobile device, a smartphone, a laptop computer, a desktop computer, a tablet personal computer (PC), a wearable device, a head mounted display (HMD) device, and the like.

The display apparatus 100 according to an embodiment of the disclosure may display an input image on the display. For example, the display apparatus 100 may display, on the display, a first image 10 and a second image 20.

The display apparatus 100 according to an embodiment of the disclosure may control brightness of the input image displayed through the display. The display apparatus 100 may adjust the brightness of the input image in consideration of a tendency of the user using the display apparatus 100. For example, the display apparatus 100 may decrease or increase the brightness of the input image, in consideration of sensitivity of the user to a brightness change in the input image.

In the disclosure, sensitivity of the user to a brightness change in an image may indicate a degree of the user recognizing the brightness change when brightness of the image is decreased or increased. For example, when the sensitivity of the user to the brightness change is high, the user recognizes the brightness change in the image or a degree of recognizing the brightness change is high. For example, when the sensitivity of the user to the brightness change is low, the user does not recognize the brightness change or the degree of recognizing the brightness change is low. The sensitivity to the brightness change in the image may vary depending on users.

For example, the display apparatus 100 may decrease the brightness of the input image when the sensitivity of the user to the brightness change in the image displayed through the display is low. In this case, even when the brightness of the input image is decreased, the sensitivity of the user is low, and thus, the user may not recognize a change in the brightness. Accordingly, power consumption of the display apparatus 100 may be reduced while a viewing experience of the user is maintained. For example, the display apparatus 100 may maintain or slightly decrease the brightness of the input image when the sensitivity of the user to the brightness change in the image is high.

To determine the sensitivity of the user to the brightness change in the image, the display apparatus 100 according to an embodiment of the disclosure may perform a sensitivity test 101. The display apparatus 100 may store, in memory, result data 102 according to the sensitivity test 101. The result data 102 may include information about a test image used during the sensitivity test 101 and information about a sensitivity level of the user for the test image. The result data 102 may further include information about whether the user has recognized a brightness change in the test image.

For example, the display apparatus 100 may test whether the user recognizes the brightness change when brightness in the test image displayed through the display is decreased or increased. For example, the display apparatus 100 may decrease the brightness of the test image displayed through the display and inquire of the user whether the brightness change is recognizable. The display apparatus 100 may receive a response to whether the user has recognized the brightness change, and determine the sensitivity level for the test image, based on the response.

For example, when the user did not recognize the brightness change, the display apparatus 100 may determine that the sensitivity level of the user for the test image is low. For example, when the user has recognized the brightness change, the display apparatus 100 may determine that the sensitivity level of the user for the test image is high.

According to an embodiment of the disclosure, the sensitivity of the user to the brightness change may vary according to image quality information of the image displayed on the display. The image quality information of the image may indicate image information that may be considered when determining the sensitivity of the user according to the brightness change in the image. For example, the image quality information of the image may include grayscale information indicating a degree of brightness of the image, number-of-objects information in the image, number-of-colors information in the image, and edge proportion information indicating a proportion of edge components or a contour in the image. For example, when a grayscale of the image is low (e.g., when the image is dark), the sensitivity of the user may be low even when the brightness of the image is decreased. For example, when the number of objects, the number of colors, and an edge proportion are high, the sensitivity of the user may be low even when the brightness of the image is decreased.

The display apparatus 100 according to an embodiment of the disclosure may perform the sensitivity test 101 using a plurality of test images having various image quality information items. For example, the display apparatus 100 may decrease brightness of each of a test image having grayscale information, a test image having number-of-objects information, a test image having a number-of-colors information, and a test image having edge proportion information, and obtain a response from the user. The display apparatus 100 may obtain a sensitivity level for the test image according to the grayscale information, a sensitivity level according to the number-of-objects information, a sensitivity level according to the number-of-colors information, and a sensitivity level according to the edge proportion information.

The display apparatus 100 according to an embodiment of the disclosure may store image quality information about a test image and information about a sensitivity level of the user for the test image in the result data 102. The display apparatus 100 may distinguish image quality information about a test image in which a brightness change is not recognizable and image quality information about a test image in which a brightness change is recognizable, and store the same in the result data 102. For example, the image quality information about the test image that is responded that the brightness change is not recognizable may be mapped to information indicating that a sensitivity level is low and stored in the result data 102. For example, the image quality information about the test image that is responded that the brightness change is recognizable may be mapped to information indicating that a sensitivity level is high and stored in the result data 102 (scc, e.g., FIG. 6).

The display apparatus 100 according to an embodiment of the disclosure may analyze the input image (operation 104) and obtain image quality information about the input image. The display apparatus 100 may control brightness of the input image (operation 105) using the result data 102 according to the sensitivity test 101. For example, the display apparatus 100 may determine the sensitivity level of the user for the input image using the result data 102 and generate driving signals 106 and 108 for controlling the brightness of the input image, based on the sensitivity level of the user for the input image. The display apparatus 100 may adjust the brightness of the input image by driving the display through the driving signals 106 and 108.

For example, the display apparatus 100 may analyze the first image 10 and the second image 20 and obtain image quality information of each of the first image 10 and the second image 20. For example, the image quality information of the first image 10 may include information indicating that a grayscale is high, the number of objects is low, the number of colors is low, and an edge proportion is low. For example, the image quality information of the second image 20 may include information indicating that a grayscale is low, the number of objects is high, a color distribution is high, and an edge proportion is high.

For example, the display apparatus 100 may match the analyzed image quality information of the input image to the result data 102 according to the sensitivity test 101. When the image quality information of the input image corresponds to image quality information about at least one test image included in the result data 102, the display apparatus 100 may identify a sensitivity level for the at least one test image. The display apparatus 100 may determine the sensitivity level for the input image, based on the sensitivity level for the at least one test image corresponding to the input image.

For example, the result data 102 may store a sensitivity level for each of a test image with a high grayscale, a test image with a low number of objects, a test image with a low number of colors, and a test image with a low edge proportion. The display apparatus 100 may identify a plurality of sensitivity levels mapped to each image quality information item of the result data 102, in response to grayscale information, number-of-objects information, number-of-colors information, and edge proportion information of the first image 10. The display apparatus 100 may determine the sensitivity level for the first image 10 by combining the identified plurality of sensitivity levels. A method of determining a sensitivity level for an input image by combining a plurality of sensitivity levels will be described in greater detail below with reference to FIGS. 7 and 11. The display apparatus 100 may determine a sensitivity level for the second image 20 in the same or similar manner to that described above.

For example, the display apparatus 100 may determine that the sensitivity level for the first image 10 is high and the sensitivity level for the second image 20 is low.

The display apparatus 100 according to an embodiment of the disclosure may generate the driving signals 106 and 108 for controlling the brightness of the input image, based on the sensitivity level of the user for the input image. For example, when the sensitivity level for the input image is low, the display apparatus 100 may generate the driving signal 106 for decreasing the brightness of the input image. When the sensitivity level of the user for the input image is high, the display apparatus 100 may generate the driving signal 108 for maintaining the brightness of the input image.

According to an embodiment of the disclosure, the driving signal may be a signal for controlling a light source. The display apparatus 100 may determine brightness of an image displayed through the display using a driving signal for driving the display. The display apparatus 100 may adjust the brightness of the image by adjusting a dimming value of the driving signal. The dimming value may be represented as intensity, a percentage, or a numerical value from 0 to 100. For example, the brightness of the image may be low when the dimming value is high, and the brightness of the image may be less low when the dimming value is low.

The display apparatus 100 according to an embodiment of the disclosure may drive the display using a driving signal corresponding, for example, to at least one of a pulse width modulation (PWM) signal or a pulse amplitude modulation (PAM) signal.

Figure 16A:
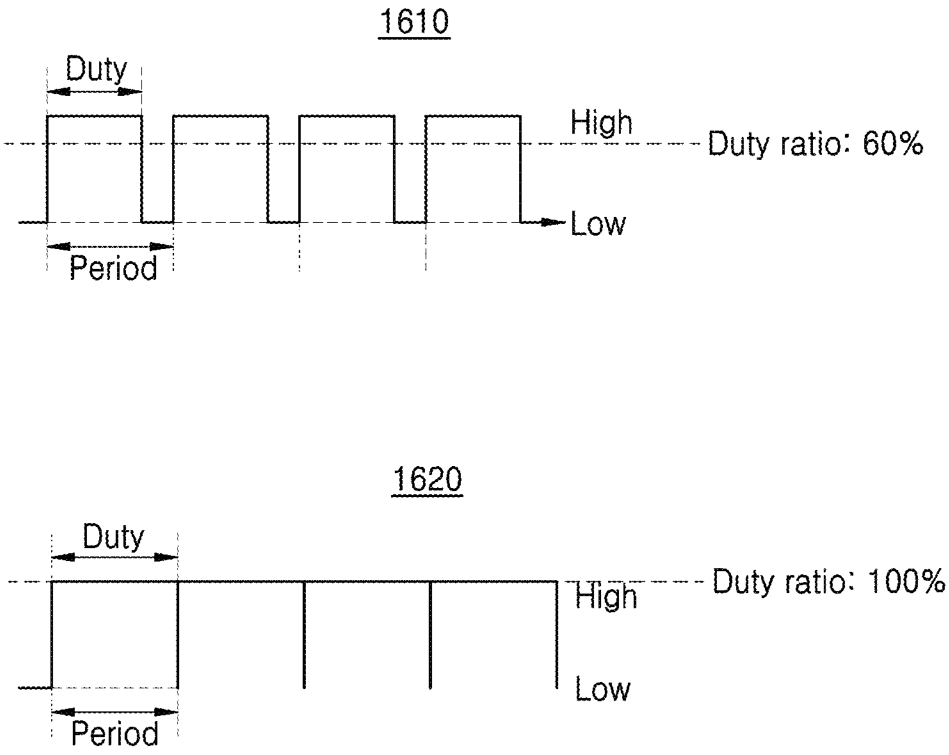
FIG. 16A illustrates examples of a pulse width modulation (PWM) signal according to a dimming value, according to various embodiments.

For example, when the display apparatus 100 drives the display using the PWM signal, the brightness of the image may be increased or decreased by increasing or decreasing a duty ratio (see, e.g., FIG. 16A). The brightness may be low when the duty ratio is low. For example, a duty ratio of the driving signal 106 (the PWM signal) may be lower than a duty ratio of the driving signal 108 (the PWM signal). For example, the display apparatus 100 may generate the driving signal 106 (the PWM signal) to decrease the brightness of the second image 20 having a low sensitivity level. The display apparatus 100 may generate the driving signal 108 (the PWM signal) to less decrease or maintain the brightness of the first image 10 having a high sensitivity level.

For example, when the display apparatus 100 drives the display using the PAM signal, the brightness of the image may be increased or decreased by increasing or decreasing a size of amplitude of the PAM signal (see, e.g., FIG. 16B). The brightness of the image may be low when the size of amplitude is small. For example, a size of amplitude of the driving signal 106 (the PAM signal) may be smaller than a size of amplitude of the driving signal 108 (the PAM signal). For example, the display apparatus 100 may generate the driving signal 106 (the PAM signal) to decrease the brightness of the second image 20 having the low sensitivity level. The display apparatus 100 may generate the driving signal 108 (the PAM signal) to less decrease or maintain the brightness of the first image 10 having the high sensitivity level.

The display apparatus 100 according to an embodiment of the disclosure may selectively decrease the brightness of the input image in consideration of a sensitivity tendency of the user. For example, when it is determined that the user does not recognize decreased brightness of an input image having specific image quality information, considering the sensitivity tendency of the user, the display apparatus 100 may decrease the brightness of the input image. Accordingly, the display apparatus 100 may reduce the power consumption while maintaining the viewing experience of the user.

Hereinafter, an operation in which the display apparatus 100 according to an embodiment of the disclosure performs the sensitivity test 101 will be described in greater detail with reference to FIGS. 2, 3, 4, 5 and 6 (which may be referred to as FIGS. 2 to 6), and an operation in which the display apparatus 100 according to an embodiment of the disclosure adjusts the brightness of the input image in consideration of the sensitivity tendency of the user will be described in greater detail with reference to FIGS. 7, 8, 9, 10, 11, 12, 13, 14, 15, 16A and 16B (which may be referred to as FIGS. 7 to 16B).

Figure 2:
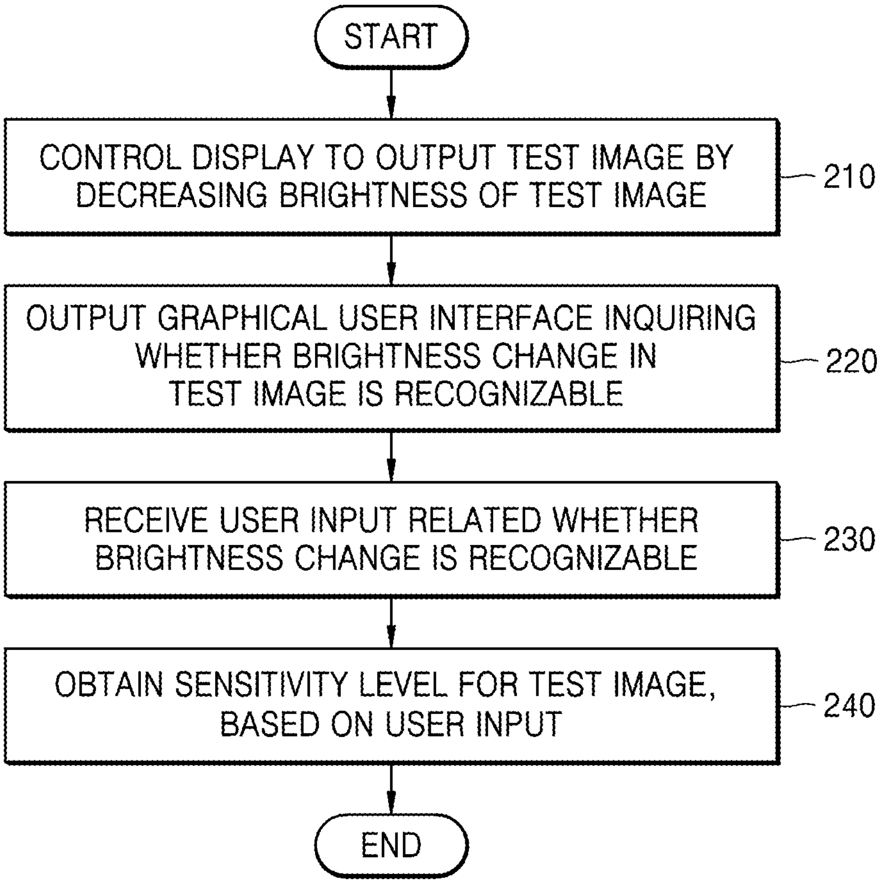
FIG. 2 is a flowchart illustrating an example method by which a display apparatus performs a sensitivity test, according to various embodiments.

FIG. 2 is a flowchart illustrating an example method by which the display apparatus performs a sensitivity test, according to various embodiments.

Referring to FIG. 2, the method according to an embodiment of the disclosure may include operations 210 to 240. Operations 210 to 240 may be performed by a processor 110 of the display apparatus 100.

The method according to an embodiment of the disclosure is not limited to FIG. 2, and may not include any one of operations of FIG. 2 or may further include an operation not illustrated in FIG. 2.

In operation 210, the processor 110 according to an embodiment of the disclosure may control the display to output a test image by decreasing brightness of the test image.

The processor 110 according to an embodiment of the disclosure may perform a sensitivity test on one or more test images. Memory 120 may store one or more test images having various types of image quality information. The processor 110 may perform the sensitivity test using the one or more test images pre-stored in the memory 120.

In general, sensitivity of the user to a brightness change may vary according to image quality information of an image displayed on the display. For example, when an object distribution or a color distribution of the image displayed on the display are diverse and wide, human eyes are not fixed on one place but track several objects. Also, according to the Weber's law, human sensory organs feel changes in stimuli only when a difference between intensity of an initial stimulus and intensity of a following stimulus is equal to or greater than a certain ratio.

Based on the above two theories, when the number of objects and the number of colors are large and an edge proportion is high in an image, a viewer may not recognize a brightness change even when brightness of the image is decreased. Also, when a grayscale indicating brightness of an image signal is low, the viewer may not recognize the brightness change even when the brightness of the image is decreased.

In the disclosure, an image with a large number of objects, a large number of colors, and a high edge proportion may be referred to as having high complexity. An image with a small number of objects, a small number of colors, and a low edge proportion may be referred to as having low complexity. The sensitivity of the user may be lower when brightness is decreased for an image with high complexity.

The processor 110 according to an embodiment of the disclosure may perform the sensitivity test on each of a plurality of test images classified for each image quality information item. The processor 110 may perform the sensitivity test using various test images having different types of image quality information, for a same image quality information item. The more the image quality information items there are, the more accurately a sensitivity tendency of the user may be determined. Also, the more the test images belonging to each image quality information item, the more accurately the sensitivity tendency of the user may be determined for each image quality information item.

Figure 3:
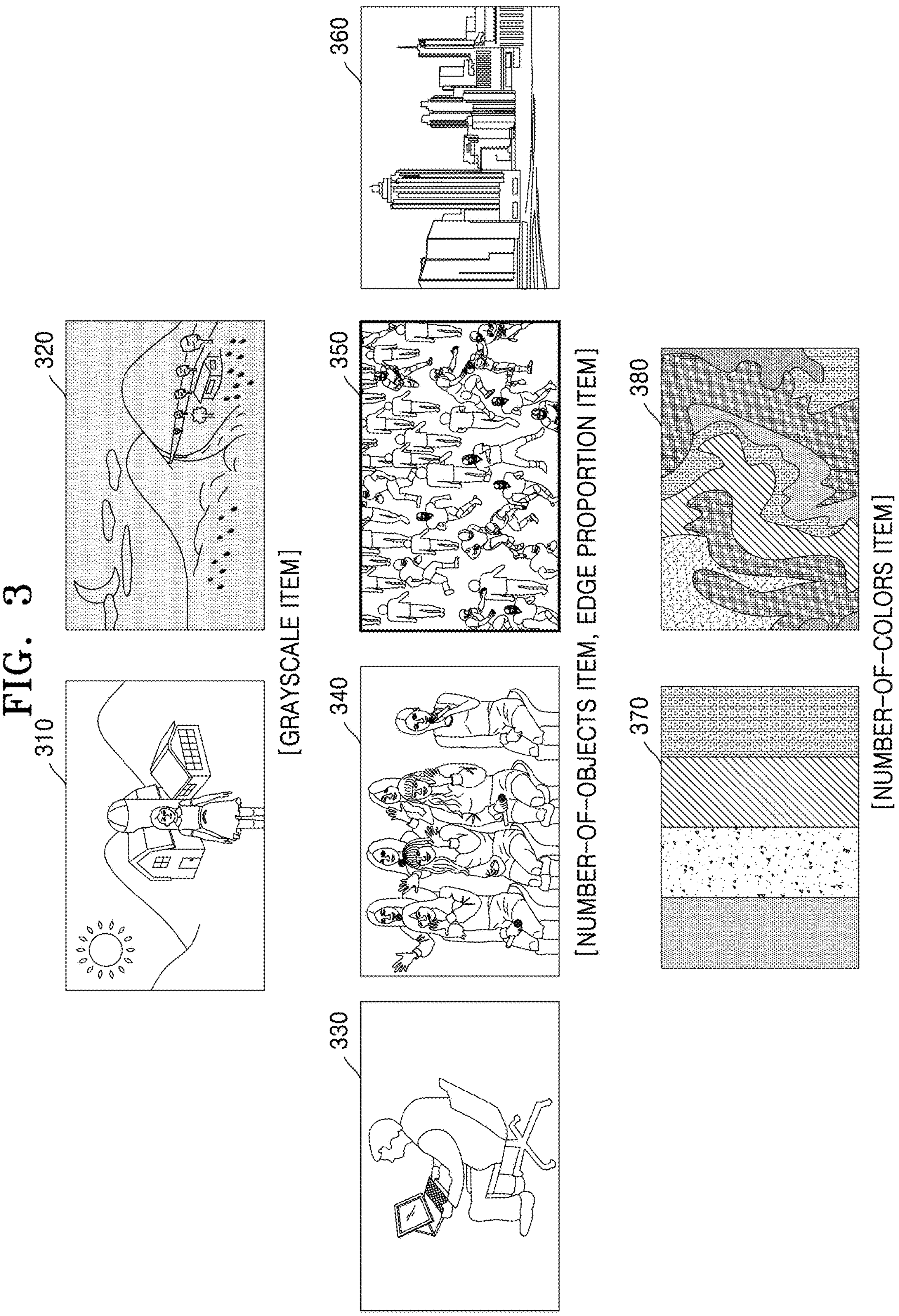
FIG. 3 is a diagram illustrating example types of test images, according to various embodiments.

FIG. 3 is a diagram illustrating types of test images, according to various embodiments.

Referring to FIG. 3, the test images may be classified according to image quality information items. For example, the image quality information items may include at least one of a grayscale item, a number-of-objects item, a number-of-colors item, or an edge proportion item. For example, a test image may be an image having image quality information about at least one item from among a plurality of image quality information items.

For example, the processor 110 may perform the sensitivity test using each of test image from a test image having a high grayscale to a test image having a low grayscale. In this case, the processor 110 may determine the sensitivity level of the user by subdividing the sensitivity level according to grayscales, and thus may accurately identify the sensitivity tendency of the user for the grayscale item.

For example, in FIG. 3, the processor 110 may use test images 310 and 320 having different types of grayscale information. The test image 310 may be an image with a high grayscale (e.g., grayscale "top"). The test image 320 may be an image with a low grayscale (e.g., grayscale "bottom"). A grayscale of an image may be represented from 0 to 100, wherein the image is a dark image with low brightness when the grayscale is close to 0, and the image is a bright image with high brightness when the grayscale is close to 100. For example, the grayscale of the test image 310 may be 80 and the grayscale of the test image 320 may be 20.

For example, the processor 110 may use test images 330, 340, 350, and 360 having different types of number-of-objects information or different types of edge proportion information. The test image 330 may be an image with a low number of objects (e.g., number of objects "bottom"). The test image 340 may be an image with an intermediate number of objects (e.g., number of objects "intermediate"). The test image 350 may be an image with a high number of objects (e.g., number of objects "top"). The test image 360 may be an image with a low number of objects and a high edge proportion (e.g., number of objects "bottom" and edge proportion "top").

For example, the processor 110 may use test images 370 and 380 having different types of number-of-colors information. The test image 370 may be an image with a low number of colors (e.g., number of colors "bottom"). The test image 380 may be an image with a high number of colors (e.g., number of colors "top").

In the disclosure, the test images 310 and 320 having the grayscale information may be referred to as first test images. The test images 330, 340, 350, and 360 having the number-of-objects information may be referred to as second test images. The test images 370 and 380 having the number-of-colors information may be referred to as third test images. The test image 360 having the edge proportion information may be referred to as a fourth test image.

The processor 110 according to an embodiment of the disclosure may perform the sensitivity test on each of the plurality of test images 310 to 380 to determine a sensitivity level for each of the plurality of test images 310 to 380.

For example, the processor 110 may determine the sensitivity level for each grayscale using the test images 310 and 320 having the grayscale information. Also, in a similar manner as in the test images 310 and 320, the processor 110 may determine the sensitivity level for each of the test images 330 to 360 having the number-of-objects information, each of the test image 370 and 380 having the number-of-colors information, and the test image 360 having the edge proportion information.

The processor 110 according to an embodiment of the disclosure may store, in memory, the determined sensitivity level by mapping the sensitivity level to image quality information about each test image (see result data 610 of FIG. 6).

An operation in which the processor 110 according to an embodiment of the disclosure displays a test image by changing brightness of the test image will be described in greater detail below with reference to FIG. 4.

Figure 4:
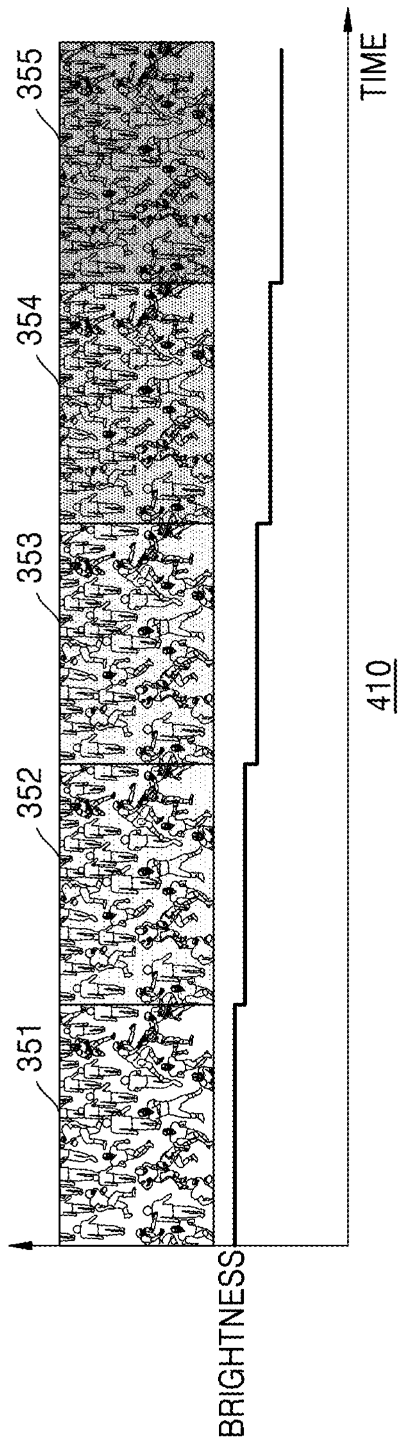
FIG. 4 is a diagram illustrating a brightness change in a test image, according to various embodiments.

FIG. 4 is a diagram illustrating a brightness change in a test image, according to various embodiments. In FIG. 4, a sensitivity test for the test image 350 in which the number of objects is "top" will be described. However, an embodiment of the disclosure is not limited to FIG. 4, and the processor 110 may perform the sensitivity test on each of the plurality of test images 310 to 380 in a same manner.

Referring to a graph 410 of FIG. 4, the processor 110 according to an embodiment of the disclosure may sequentially or gradually decrease brightness of the test image 350. For example, the processor 110 may generate a driving signal having a defined dimming value at regular time intervals so as to decrease the brightness of the test image 350 by a defined amount at regular time intervals. The brightness of the test image 350 displayed through the display may be decreased at regular time intervals by the defined amount.

For example, as shown in FIG. 4, when a target brightness change amount is 3%, the processor 110 may decrease the brightness by 0.6% each through five frames 351, 352, 353, 354, and 355. In this case, the processor 110 may generate the driving signal having the dimming value of 0.6% per frame, five times. The processor 110 may control the display using the driving signal having the dimming value of 0.6% per frame so as to decrease the brightness of the test image 350 by 0.6% per frame.

For example, the processor 110 may decrease a duty ratio of a PWM signal by 0.6% per frame. For example, the processor 110 may decrease an amplitude size of a PAM signal by 0.6% per frame. However, the above numerical value is simply for convenience of description, and a rate at which a dimming value is adjusted and a rate at which a duty ratio of a PAM signal or an amplitude size of a PAM signal is adjusted may not be the same.

According to an embodiment of the disclosure, a brightness change speed and a brightness change amount may be pre-set or may be adjusted according to a user setting. For example, the processor 110 may decrease the brightness change speed by decreasing the brightness of the test image 350 by 0.6% per frame through five frames and then decreasing the brightness by 0.1% per frame through 30 frames. The processor 110 may decrease the brightness change speed by decreasing the brightness of the test image 350 by 0.6% per three frames. Accordingly, the brightness of the test image 350 may be further smoothly changed. For example, the processor 110 may decrease the brightness change amount by decreasing a target brightness change amount for the test image 350 from 3% to 1%. For example, the processor 110 may decrease the brightness change speed by decreasing a dimming value per frame or decrease the brightness change amount by decreasing a total dimming value.

For example, the processor 110 may decrease the brightness change speed or decrease the brightness change amount for a test image that is predicted to have a high sensitivity level compared to other test images. In general, it is highly likely that the user may recognize a brightness change in an image with a low grayscale, a low number of objects, a low number of colors, or a low edge proportion. Accordingly, the processor 110 may decrease the brightness change speed or decrease the brightness change amount for the test image that is predicted to have the high sensitivity level, and identify whether the user has recognized a brightness change, thereby obtaining a further accurate test result.

A method by which the processor 110 adjusts brightness of a test image is not limited to the above embodiment of the disclosure, and the processor 110 may generate a driving signal having a target dimming value (e.g., 3%) at once so that a target brightness change amount is adjusted at once.

Referring back to FIG. 2, in operation 220, the processor 110 according to an embodiment of the disclosure may output a graphical user interface inquiring whether a brightness change in the test image is recognizable. In operation 230, the processor 110 according to an embodiment of the disclosure may receive a user input related to whether the brightness change is recognizable. In operation 240, the processor 110 according to an embodiment of the disclosure may obtain a sensitivity level for the test image, based on the user input.

Figure 5:
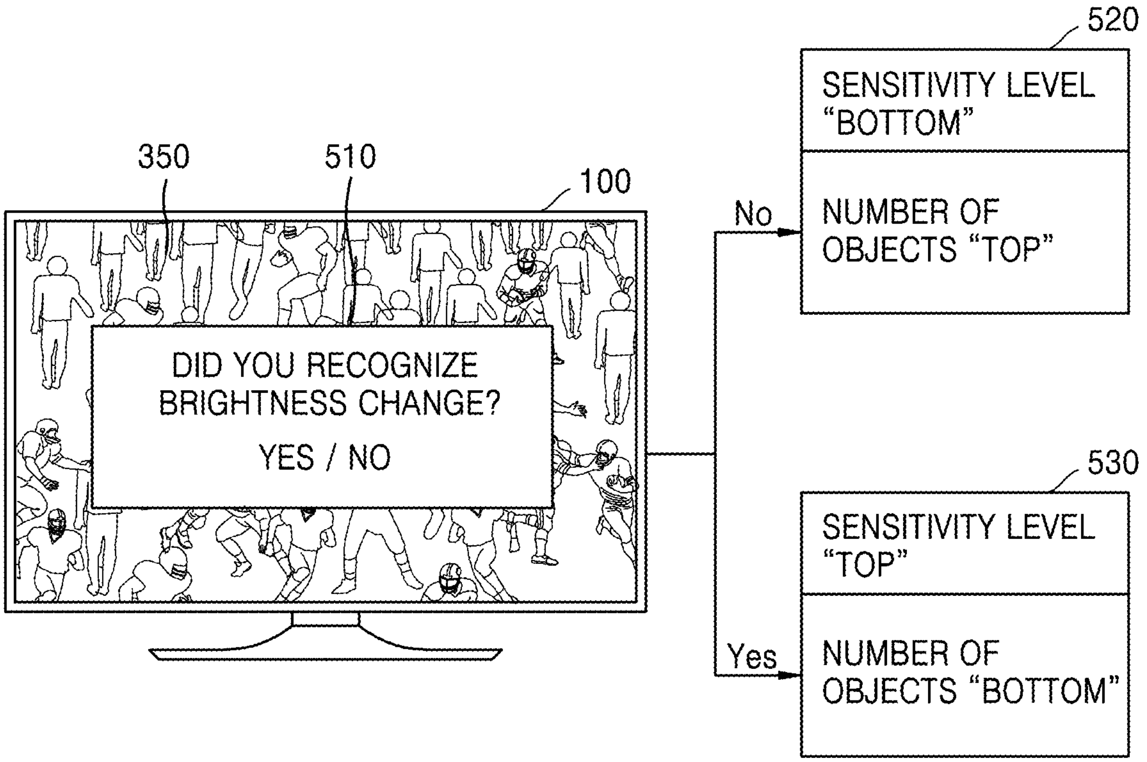
FIG. 5 is a diagram illustrating an example graphical user interface in which a display apparatus inquires whether a brightness change is recognizable, according to various embodiments.

FIG. 5 is a diagram illustrating an example graphical user interface (GUI) in which the display apparatus inquires whether a brightness change is recognizable, according to various embodiments.

For example, the display apparatus 100 may display a GUI 510 inquiring whether a brightness change in the test image 350 has been recognized, as shown in FIG. 5. The display apparatus 100 may receive a user input of selecting a response user interface (UI) (e.g., YES/NO) included in the GUI 510. The display apparatus 100 may determine a sensitivity level for the test image 350, based on the user input of selecting the response UI.

For example, the display apparatus 100 may receive a user input (e.g., NO) corresponding to unrecognition of the brightness change in the test image 350. The display apparatus 100 may determine the sensitivity level for the test image 350 to be "top", based on the user input. The display apparatus 100 may map image quality information (e.g., the number of objects "top") about the test image 350 that is responded that the brightness change is not recognized and information (e.g., sensitivity level "bottom") about the sensitivity level determined for the test image 350, and store same in memory 520.

The display apparatus 100 may, for example, receive a user input (e.g., YES) corresponding to recognition of the brightness change in the test image 350. The display apparatus 100 may determine the sensitivity level for the test image 350 to be "bottom", based on the user input. The display apparatus 100 may map the image quality information (e.g., the number of objects "bottom") about the test image 350 that is responded that the brightness change is recognized and the information (e.g., sensitivity level "top") about the sensitivity level determined for the test image 350, and store same in memory 530.

The sensitivity level being "bottom" may correspond to information indicating that the sensitivity level is low, and the sensitivity level being "top" may correspond to information indicating that the sensitivity level is high.

The processor 110 according to an embodiment of the disclosure may decrease a brightness change speed or decrease a brightness change amount and perform a retest, based on receiving the user input (e.g., YES) corresponding to the recognition of the brightness change in the test image 350.

In general, it is highly likely that the user may recognize a brightness change when brightness of an image is decreased in a large amount at once or is rapidly decreased. In this case, the processor 110 may perform a test again to verify whether the user recognizes a brightness change even when brightness of a test image is decreased in a small amount or is slowly decreased, to thereby obtain a further accurate test result.

The processor 110 according to an embodiment of the disclosure may further output a GUI inquiring of the user whether to perform the retest.

The processor 110 according to an embodiment of the disclosure may store, in memory, result data according to a sensitivity test. Hereinafter, the result data stored in the memory will be described in greater detail with reference to FIG. 6.

FIG. 6 includes tables illustrating an example of result data according to a sensitivity test, according to various embodiments.

Referring to FIG. 6, the processor 110 may store, in the memory, image quality information about a test image and a sensitivity level of a user for the test image. The processor 110 may also store, in the memory, information about whether the user has recognized a brightness change in the test image.

The processor 110 may distinguish image quality information about a test image in which a brightness change is not recognizable and image quality information about a test image in which a brightness change is recognizable, and store the same in the memory.

The processor 110 according to an embodiment of the disclosure may perform a sensitivity test on each of a plurality of test images classified for each of a plurality of image quality information items and obtain the result data 610. The processor 110 may store, in the result data 610 for each of the plurality of image quality information items, a sensitivity level for each of the plurality of test images classified according to the plurality of image quality information items.

For example, the result data 610 may store at least one of a sensitivity level according to grayscales, a sensitivity level according to the numbers of objects, a sensitivity level according to the numbers of colors, or a sensitivity level according to edge proportions.

For example, the processor 110 may map image quality information about a test image that is responded that a brightness change is not recognized to information (e.g., sensitivity level "bottom") indicating that a sensitivity level is low, and store the same in the memory. For example, the processor 110 may map image quality information of a test image, in which a grayscale item is a grayscale "bottom", to sensitivity level "bottom" information. For example, the processor 110 may map image quality information of a test image, in which a number-of-objects item is a number of objects "top", to the sensitivity level "bottom" information. For example, the processor 110 may map image quality information of a test image, in which a number-of-colors item is a number of colors "top", to the sensitivity level "bottom" information. For example, the processor 110 may map image quality information of a test image, in which an edge proportion item is an edge proportion "top", to the sensitivity level "bottom" information.

For example, the processor 110 may map image quality information about a test image that is responded that a brightness change is recognized to information (e.g., sensitivity level "top") indicating that a sensitivity level is high, and store the same in the memory. For example, the processor 110 may map image quality information of a test image, in which a grayscale item is a grayscale "top", to sensitivity level "top" information. For example, the processor 110 may map image quality information of a test image, in which a number-of-objects item is a number of objects "bottom", to the sensitivity level "top" information. For example, the processor 110 may map image quality information of a test image, in which a number-of-colors item is a number of colors "bottom", to the sensitivity level "top" information. For example, the processor 110 may map image quality information of a test image, in which an edge proportion item is an edge proportion "bottom", to the sensitivity level "top" information.

In this case, the processor 110 may combine the sensitivity levels for the plurality of test images stored in the result data 610 and use the same to determine a sensitivity level for an input image. For example, the processor 110 may match image quality information of the input image to the image quality information of each of the plurality of test images, for each of a plurality of image quality information items in the input image, and determine the sensitivity level for the input image by combining the plurality of sensitivity levels for the matched plurality of test images.

When the processor 110 according to an embodiment of the disclosure performs the sensitivity test on the test image classified for each image quality information item and uses the result data 610, the sensitivity level for the input image may be determined by combining the sensitivity levels for each image quality information item, and thus, the sensitivity test may be simplified. A method of determining a sensitivity level for an input image by combining a plurality of sensitivity levels will be described in greater detail below with reference to FIG. 11.

The processor 110 according to an embodiment of the disclosure may perform a sensitivity test using a test image in which image quality information items are combined and obtain result data 620. The processor 110 may store, in the result data 620, a sensitivity level for the test image in which the image quality information items are combined.

For example, the processor 110 may perform the sensitivity test using a test image in which at least two items from among grayscale information, number-of-objects information, number-of-colors information, and edge proportion information are combined. For example, the result data 620 may store sensitivity levels for a plurality of test images in which at least two items from among grayscale information, number-of-objects information, number-of-colors information, and edge proportion information are combined.

The result data 620 of FIG. 6 stores four different test images in which four image quality information items are combined, but is not limited thereto. For example, more than four or fewer than four image quality information items may be combined.

For example, the processor 110 may map, to sensitivity level "bottom" information, image quality information of a fifth test image in which a grayscale is low, the number of objects is high, the number of colors is high, and an edge proportion is high. For example, the processor 110 may map, to sensitivity level "top" information, image quality information of a sixth test image in which a grayscale is high, the number of objects is low, the number of colors is low, and an edge proportion is low.

In this case, the processor 110 may determine a sensitivity level for an input image using a sensitivity level for at least one test image in which image quality information items are combined, the sensitivity level for the at least one test image being stored in the result data 620. For example, the processor 110 may identify at least one test image corresponding to the image quality information of the input image, for each of the plurality of image quality information items of the input image. The processor 110 may determine the sensitivity level for the at least one test image as the sensitivity level for the input image.

When the processor 110 according to an embodiment of the disclosure performs the sensitivity test on the test images combined for each image quality information item and uses the result data 620, the sensitivity level for the input image may be determined using the sensitivity level for the image quality information that is matched to the input image in a one-to-one manner, and thus, a sensitivity tendency of the user may be further accurately reflected. This will be described in greater detail below with reference to FIG. 12.

Figure 7:
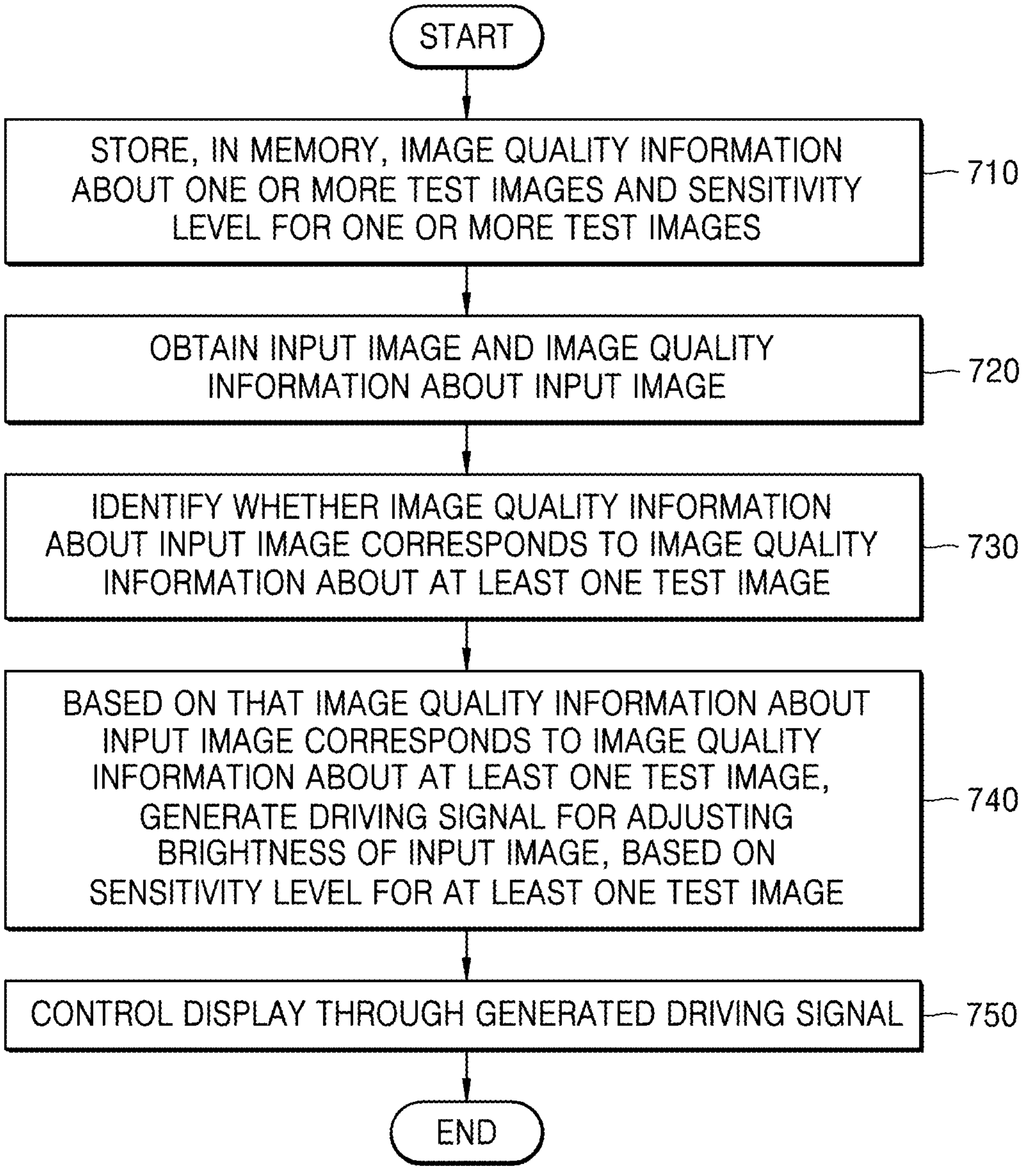
FIG. 7 is a flowchart illustrating an example method of operating a display apparatus, according to various embodiments.

FIG. 7 is a flowchart illustrating an example method of operating the display apparatus, according to various embodiments.

Referring to FIG. 7, the operating method of the display apparatus 100, according to an embodiment of the disclosure, may include operations 710 to 750. Operations 710 to 750 may be performed by the processor 110 of the display apparatus 100.

The method of operating the display apparatus 100, according to an embodiment of the disclosure, is not limited to FIG. 7, and may not include any one of operations of FIG. 7 or may further include an operation not illustrated in FIG. 7.

In operation 710, the processor 110 according to an embodiment of the disclosure may store, in memory, image quality information about one or more test images and a sensitivity level for the one or more test images.

In the disclosure, image quality information about a test image may be information that may be used to determine sensitivity of a user to a brightness change in the test image. For example, image quality information may indicate information about complexity of an image. Image quality information of an image may include information identifiable through metadata or the like, information analyzable using a certain algorithm, and the like.

For example, image quality information about a test image may include at least one of grayscale information of the test image, number-of-objects information, number-of-colors information, or edge proportion information.

In the disclosure, a sensitivity level may indicate a sensitivity tendency of a user regarding a brightness change in an image. A sensitivity level may be determined through a sensitivity test for identifying whether a user recognizes a brightness change when brightness of a test image is decreased or increased.

According to an embodiment of the disclosure, the processor 110 may store, in the memory, result data according to a sensitivity test. The result data may include the image quality information about the one or more test images and information about the sensitivity level for the one or more test images. An operation of obtaining result data according to a sensitivity test has been described above with reference to FIGS. 2 to 6.

Sensitivity of the user to a brightness change may vary according to image quality information of an image displayed on the display. For example, the sensitivity of the user to the brightness change may vary according to the grayscale information, the number-of-objects information, the number-of-colors information, and the edge proportion information included in the test image.

According to an embodiment of the disclosure, the result data may distinguishably store image quality information about a test image in which a brightness change is not recognizable and image quality information about a test image in which a brightness change is recognizable.

For example, referring to FIG. 6, in the result data 610 and 620, image quality information about a test image, in which a brightness change is not recognized, may be mapped to information indicating that a sensitivity level is low. In the result data 610 and 620, image quality information about a test image, in which a brightness change is recognized, may be mapped to information indicating that a sensitivity level is high.

For example, the result data 610 and 620 may store a sensitivity level for each of a plurality of test images including various image quality information items. For example, the result data 610 may store at least one of a sensitivity level according to grayscales, a sensitivity level according to the numbers of objects, a sensitivity level according to the numbers of colors, or a sensitivity level according to edge proportions. For example, the result data 620 may store a sensitivity level for at least one test image in which at least two items from among grayscale information, number-of-objects information, number-of-colors information, and edge proportion information are combined.

According to an embodiment of the disclosure, the image quality information about the one or more test images and the sensitivity level for the one or more test images may be information received by the processor 110 from an external device. For example, the processor 110 may receive result data according to a sensitivity test from the external device and store the same.

In operation 720, the processor 110 according to an embodiment of the disclosure may obtain an input image and image quality information about the input image.

According to an embodiment of the disclosure, the processor 110 may obtain the input image. The processor 110 may control the display to display the input image.

According to an embodiment of the disclosure, the processor 110 may analyze the input image to obtain the image quality information about the input image. Image quality information about an input image may be information that may be used to determine sensitivity of a user to a brightness change in the input image. For example, image quality information may indicate information about complexity of an image. Image quality information of an input image may include information identifiable through metadata or the like, information analyzable using a certain algorithm, an artificial intelligence model, or the like.

According to an embodiment of the disclosure, image quality information about an input image may include at least one of grayscale information of the input image, number-of-objects information, number-of-colors information, or edge proportion information.

For example, the processor 110 may obtain grayscale information of an image, based on a signal of the input image. For example, grayscale information may be information representing a degree of brightness and darkness of an image. A grayscale of an image may be represented from 0 to 100, wherein the image is a dark image with low brightness when the grayscale is close to 0, and the image is a bright image with high brightness when the grayscale is close to 100.

For example, the processor 110 may obtain number-of-objects information, number-of-colors information, edge proportion information, and the like using a certain algorithm or an artificial intelligence model. This will be described in greater detail below with reference to FIGS. 8, 9 and 10 (which may be referred to as FIGS. 8 to 10).

According to an embodiment of the disclosure, the processor 110 may analyze the image quality information of the input image to classify a class of each piece of image quality information. For example, the processor 110 may obtain a grayscale value of the input image, and classify that the input image is an image with a high grayscale when the grayscale value is equal to or greater than a threshold value and that the input image is an image with a low grayscale when the grayscale value is less than the threshold value.

In a same or similar manner, the processor 110 may analyze the number-of-objects information, the number-of-colors information, and the edge proportion information, and classify a class for each piece of image quality information. This will be described with in greater detail below with reference to FIGS. 8 to 10.

A criterion for classifying a class of image quality information of an input image and a criterion for classifying a class of image quality information of a test image may be the same.

In operation 730, the processor 110 according to an embodiment of the disclosure may identify whether the image quality information about the input image corresponds to image quality information about at least one test image.

In operation 740, based on the image quality information about the input image corresponding to the image quality information about the at least one test image, the processor 110 according to an embodiment of the disclosure may generate a driving signal for adjusting brightness of the input image, based on a sensitivity level for the at least one test image.

According to an embodiment of the disclosure, the processor 110 may match the analyzed image quality information about the input image to the result data stored in operation 710. When the image quality information about the input image corresponds to the image quality information about the at least one test image included in the result data, the processor 110 may identify a sensitivity level for the at least one test image. The processor 110 may determine the sensitivity level for the input image, based on the identified sensitivity level for the at least one test image.

For example, when the result data 610 stores a sensitivity level for each of a plurality of test images classified for each of a plurality of image quality information items, the processor 110 may identify whether the image quality information of the input image corresponds to image quality information of each of the plurality of test images, for each of the plurality of image quality information items in the input image. The processor 110 may identify pieces of image quality information of the plurality of test images corresponding to the image quality information of the input image, and identify a plurality of sensitivity levels respectively for the pieces of image quality information of the plurality of test images. The processor 110 may combine the identified plurality of sensitivity levels to determine the sensitivity level for the input image, and generate the driving signal according to the sensitivity level. This will be described in detail with reference to FIG. 11.

For example, when the result data 620 stores a sensitivity level for at least one test image in which image quality information items are combined, the processor 110 may identify whether the image quality information of the input image corresponds to image quality information of the at least one test image, for each of the plurality of image quality information items in the input image. The processor 110 may identify the image quality information of the at least one test image corresponding to the image quality information of the input image, and identify a sensitivity level for the image quality information of the at least one test image. The processor 110 may determine the identified sensitivity level as the sensitivity level for the input image. This will be described in greater detail below with reference to FIG. 12.

Figure 13:
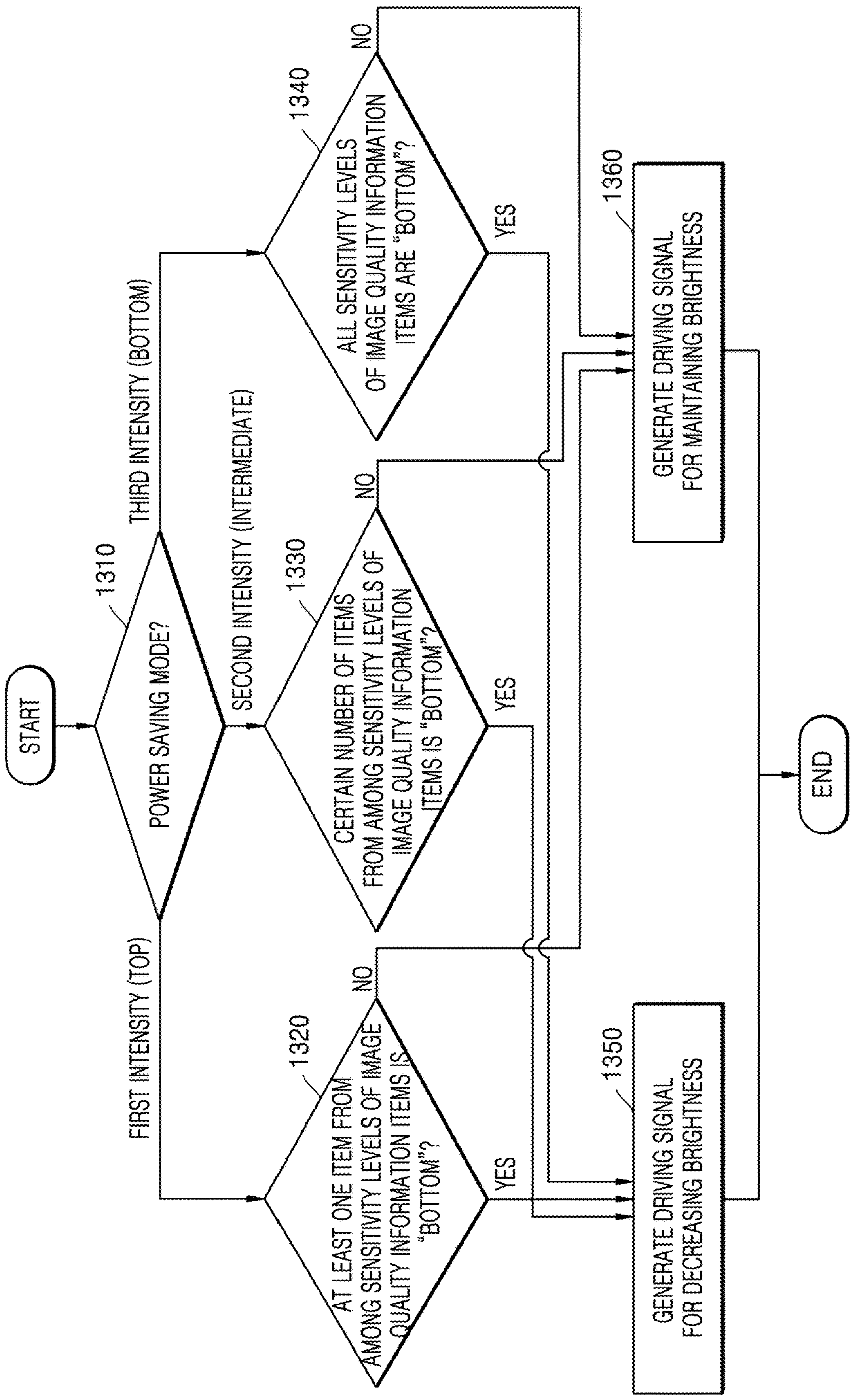
FIG. 13 is a flowchart illustrating an example method by which a display apparatus adjusts brightness of an input image according to intensity of a power saving mode, according to various embodiments.

When a plurality of sensitivity levels identified for each image quality information item according to an embodiment of the disclosure are different from each other, the processor 110 may determine the sensitivity level for the input image by combining the plurality of sensitivity levels as shown in FIG. 13. For example, the processor 110 may determine the sensitivity level for the input image in consideration of intensity of a power saving mode.

According to an embodiment of the disclosure, the processor 110 may generate the driving signal for adjusting the brightness of the input image, based on the sensitivity level for the input image.

In operation 750, the processor 110 according to an embodiment of the disclosure may control the display through the generated driving signal.

The processor 110 according to an embodiment of the disclosure may control brightness of an image displayed through the display using the driving signal for driving the display. The processor 110 may adjust a dimming value of the driving signal to adjust an amount of current applied to the display. For example, when the dimming value is increased, the amount of current applied to the display is decreased, and thus, the brightness of the image may be decreased. For example, when the dimming value is decreased, the brightness of the image may be less decreased.

According to an embodiment of the disclosure, the driving signal may be a signal for controlling a light source. For example, the light source may include at least one of a backlight unit and pixels that independently emit light.

The processor 110 according to an embodiment of the disclosure may determine the dimming value based on the sensitivity level for the input image. For example, when the sensitivity level for the input image is low, the processor 110 may generate the driving signal including a first dimming value for decreasing the brightness. For example, when the sensitivity level for the input image is high, the processor 110 may generate the driving signal including a second dimming value for maintaining or less decreasing the brightness. The second dimming value may be smaller than the first dimming value.

For example, the processor 110 may generate the driving signal including the first dimming value, based on that the at least one test image corresponding to the input image corresponds to a low sensitivity level. For example, the processor 110 may generate the driving signal including the second dimming value, based on that the at least one test image corresponding to the input image corresponds to a high sensitivity level.

The driving signal according to an embodiment of the disclosure may include at least one of a PWM signal or a PAM signal and the display apparatus 100 may adjust brightness by adjusting a PWM duty ratio/PAM amplitude.

For example, a PWM duty ratio of the driving signal including the first dimming value may be smaller than a PWM duty ratio of the driving signal including the second dimming value. For example, a PAM amplitude size of the driving signal including the first dimming value may be smaller than a PAM amplitude size of the driving signal including the second dimming value. This will be described with reference to FIGS. 16A and 16B.

According to an embodiment of the disclosure, the processor 110 may sequentially decrease the brightness of the input image. For example, the processor 110 may generate the driving signal including a defined dimming value at regular time intervals so as to decrease the brightness of the input image by a defined amount at regular time intervals. The brightness of the input image displayed through the display may be decreased at regular time intervals by the defined amount.

An operation in which the processor 110 sequentially decreases the brightness of the input image may be the same as or similar to the operation of FIG. 4 in which the processor 110 sequentially decreases the brightness of the test image. For example, as shown in FIG. 4, when a target brightness change amount for the input image is 3%, the processor 110 may decrease the brightness of the input image by 0.6% per frame through five frames. For example, to further smoothly decrease the brightness of the input image, the processor 110 may further decrease a brightness change speed.

The processor 110 according to an embodiment of the disclosure may perform an image process instead of adjusting, through the driving signal, brightness of an image displayed on the display. For example, the processor 110 may adjust a pixel value of an image using a certain algorithm. For example, the processor 110 may decrease brightness of an image displayed on the display by decreasing a grayscale value extracted from an image signal.

Figure 8:
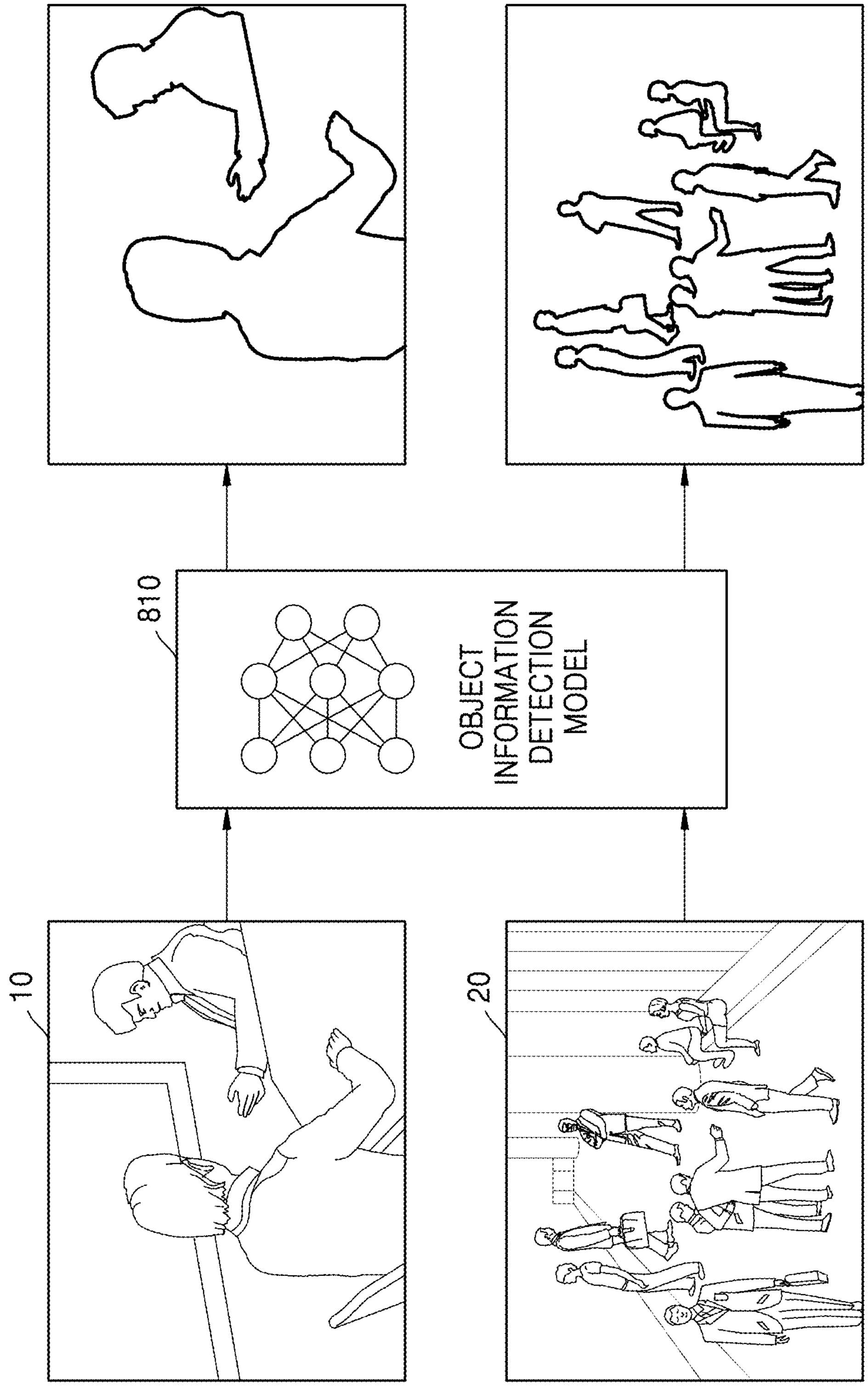
FIG. 8 is a diagram illustrating an example operation in which a display apparatus detects object information of an input image, according to various embodiments.

FIG. 8 is a diagram illustrating an example operation in which the display apparatus detects object information of an input image, according to various embodiments.

Referring to FIG. 8, the processor 110 according to an embodiment of the disclosure may obtain number-of-objects information of an input image. FIG. 8 may correspond to operation 720 of FIG. 7.

For example, the processor 110 may extract the number-of-objects information from the input image using an object information detection model 810.

According to an embodiment of the disclosure, the object information detection model 810 may include an artificial intelligence model trained to infer, from an image, an area (object area) where an object is present and infer the number of object areas. The processor 110 may identify how may objects are present per frame of an image using the object information detection model 810.

For example, the object information detection model 810 may be an artificial intelligence model trained based on a training data set including various images including objects. The object information detection model 810 may be trained using a training data set for identifying a simple or flat area, such as the sky or the ocean, as background, and identifying an object area, such as a person, an animal, or an object.

For example, the processor 110 may detect a boundary box indicating an object area detected through the object information detection model 810 and infer the number of objects corresponding to the number of boundary boxes. The object information detection model 810 may include neural network layers for detecting an object area and the number of objects, and weights. For example, the object information detection model 810 may include a you only look once (YOLO), a single shot multibox detector (SSD), or a region-based convolutional neural network (R-CNN), but is not limited thereto.

For example, the processor 110 may input the first image 10 to the object information detection model 810. The object information detection model 810 may infer an object area in the first image 10 and output that there are two object areas. The processor 110 may identify that the number of objects in the first image 10 is two.

For example, the processor 110 may input the second image 20 to the object information detection model 810 and identify that the number of objects in the second image 20 is nine.

According to an embodiment of the disclosure, the processor 110 may compare an obtained number of objects with a threshold number, and classify an image as an image having a large number of objects when the number of objects is equal to or greater than the threshold number and the image as an image having a small number of objects when the number of objects is less than the threshold number. For example, the processor 110 classify the first image 10 as an image having a large number of objects and the second image 20 as an image having a small number of objects.

Figure 9:
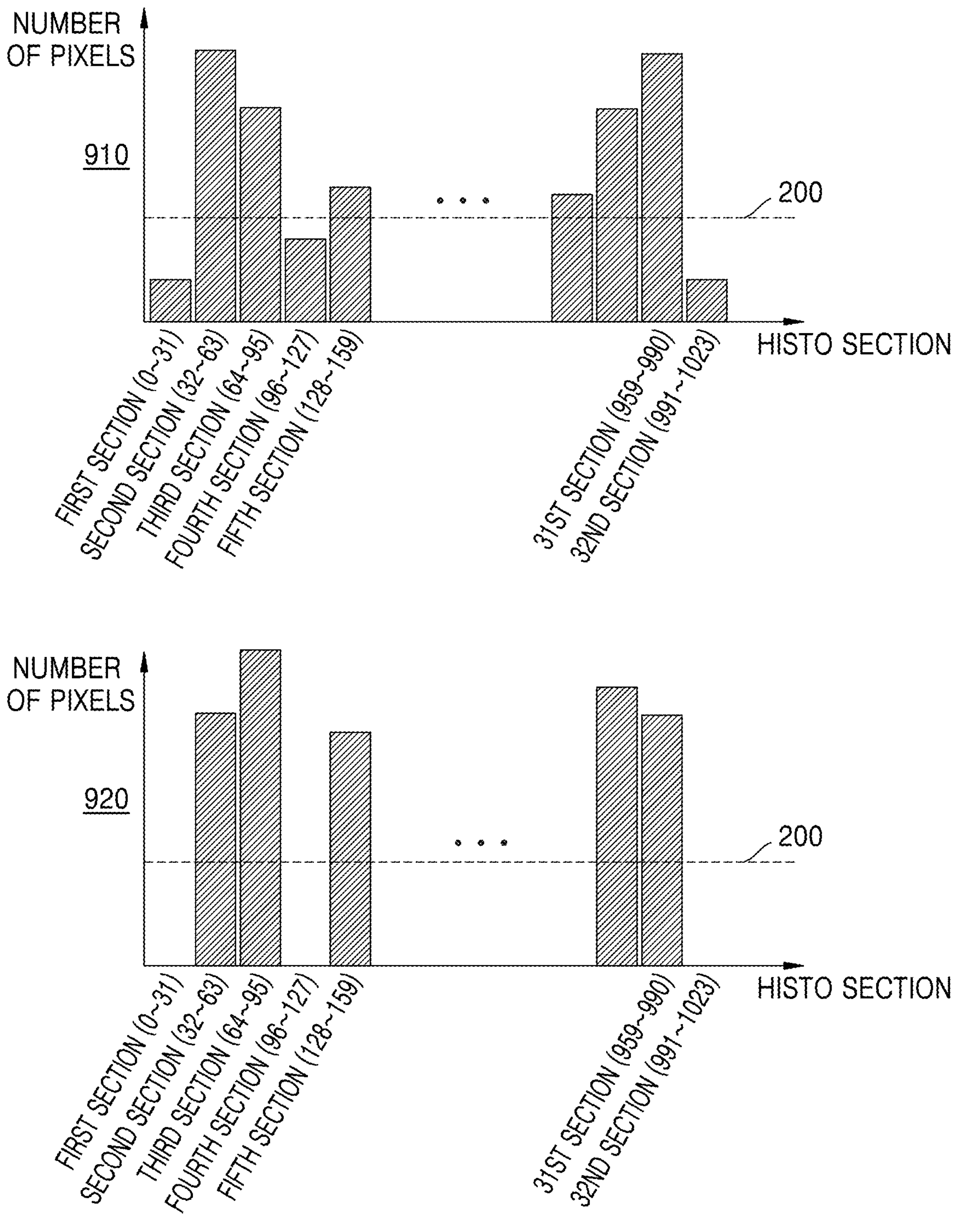
FIG. 9 is an example of a color distribution histogram of an input image, which is calculated by a display apparatus, according to various embodiments.

FIG. 9 illustrates an examples of a color distribution histogram of an input image, which is calculated by the display apparatus, according to various embodiments.

Referring to FIG. 9, the processor 110 according to an embodiment of the disclosure may obtain number-of-colors information of an input image. FIG. 9 may correspond to operation 720 of FIG. 7.

For example, the processor 110 may obtain a color distribution histogram for pixels converted into hue components using a color distribution histogram extraction module, and extract number-of-colors information from an input image.

For example, the processor 110 may convert a color component of a pixel in an image. For example, the display apparatus 100 may convert a pixel in an image in an RGB format into an HSV format and detect a hue component. Like the RGB format, the HSV format may display a color image in three channels. H denotes hue, S denotes saturation, and V denotes value.

The processor 110 may obtain the color distribution histogram indicating a distribution of hue components in the input image by accumulating the hue components in pixels of the input image in each hue section. The color distribution histogram may be a distribution diagram indicating a state in which the pixels in the image are accumulated in the hue sections corresponding to respective hue components. In the color distribution histogram, a plurality of hue levels (e.g., 1024 levels) may be divided into a plurality of hue sections (e.g., 32 sections). The pixels may be accumulated in each hue section.

The processor 110 may obtain the number-of-colors information by calculating the number of hue sections in which the pixels in the image are accumulated. For example, the processor 110 may identify the total number of hue sections in which the pixels in the image are accumulated.

For example, the processor 110 may identify, from the color distribution histogram, the number of hue sections in which the number of accumulated pixels is equal to or greater than a threshold value from among the hue sections in which the pixels are accumulated.

For example, a first histogram 910 may be a color distribution histogram related to an image in which pixels are accumulated in nine hue sections. A second histogram 920 may be a color distribution histogram related to an image in which pixels are accumulated in five hue sections. For example, when the number of hue sections in which at least 200 pixels are accumulated is to be identified, the processor 110 may identify that the number of hue sections in the first histogram 910 is 6. The processor 110 may obtain information indicating that the number of colors of the input image is 6. Also, the processor 110 may identify that the number of hue sections in the second histogram 920 is 5, and thus may obtain information indicating that the number of colors of the input image is 5.

According to an embodiment of the disclosure, the processor 110 may compare an obtained number of colors with a threshold number, and classify an image as an image having a large number of colors when the number of objects is equal to or greater than the threshold number and the image as an image having a small number of objects when the number of colors is less than the threshold number. For example, the processor 110 may classify an image corresponding to the first histogram 910 as an image having a large number of colors and an image corresponding to the second histogram 920 as an image having a small number of colors.

Figure 10:
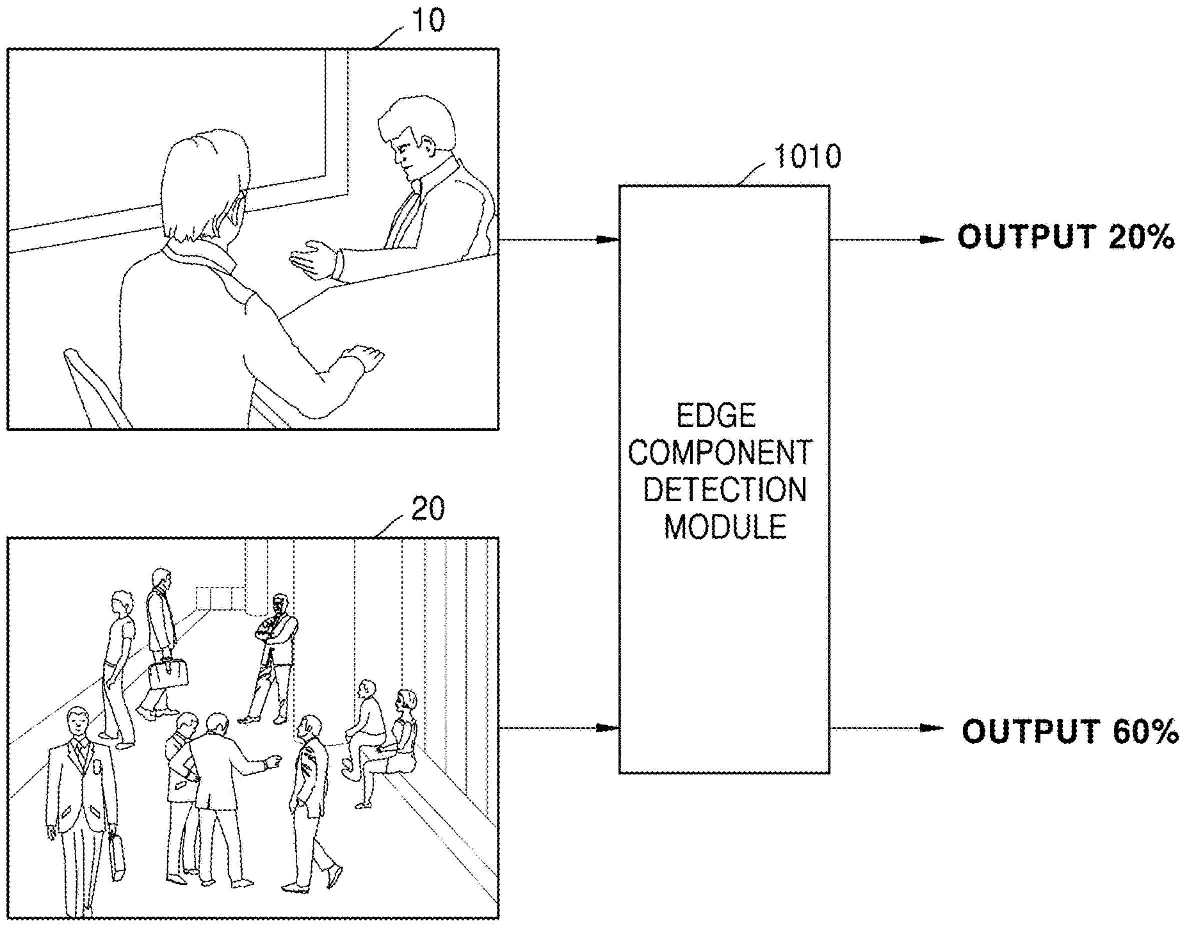
FIG. 10 is a diagram illustrating an example operation in which a display apparatus detects an edge component of an input image, according to various embodiments.

FIG. 10 is a diagram illustrating an example operation in which the display apparatus detects an edge component of an input image, according to various embodiments.

Referring to FIG. 10, the processor 110 according to an embodiment of the disclosure may obtain edge proportion information of an input image. FIG. 10 may correspond to operation 720 of FIG. 7.

For example, the processor 110 may extract an edge from the input image using an edge component detection model 1010 and obtain the edge proportion information. Edge proportion information indicates information about a proportion of an edge component in an image occupying an entire image.

According to an embodiment of the disclosure, the processor 110 may extract an edge that is a point where a change in a color, brightness, or texture is rapid in an image or a point where a pixel value is discontinuous, using the edge component detection model 1010. When an edge proportion is high, an image may include many details or contours. When an edge proportion is low, an image may be a flat with less details or contours.

For example, the processor 110 may input the first image 10 to the edge component detection model 1010 and calculate an edge proportion of the first image 10. For example, the display apparatus 100 may identify that an edge component of the first image 10 is 20% of the entire area.

For example, the processor 110 may input the second image 20 to the edge component detection model 1010 and identify that an edge component of the second image 20 is 60% of the entire area.

According to an embodiment of the disclosure, the processor 110 may compare an obtained edge proportion with a threshold value, and classify an image as an image having a high edge proportion when the edge proportion is equal to or greater than the threshold value and the image as an image having a low edge proportion when the edge proportion is less than the threshold value. For example, the processor 110 classify the first image 10 as an image having a low edge proportion and the second image 20 as an image having a high edge proportion.

Figure 11:
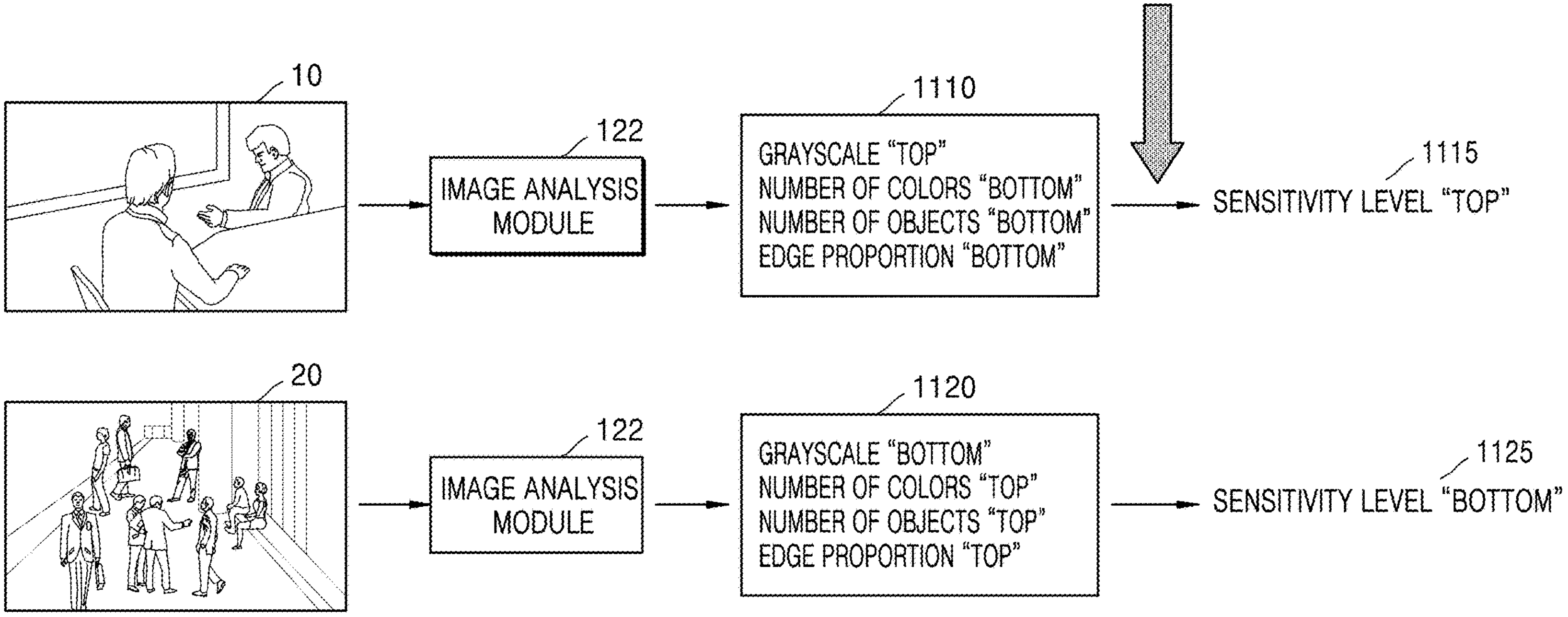
FIG. 11 is a diagram illustrating an example operation in which a display apparatus determines a sensitivity level for an input image using a sensitivity test result, according to various embodiments.

FIG. 11 is a diagram illustrating an example operation in which the display apparatus determines a sensitivity level for an input image using a sensitivity test result, according to various embodiments.

Referring to FIG. 11, an operation in which the processor 110 according to an embodiment of the disclosure determines a sensitivity level of an input image using the result data 610 will be described.

For example, the processor 110 may analyze the first image 10 using an image analysis module (e.g., including various circuitry and/or executable program instructions executable by various circuitry) 122 and obtain image quality information 1110 of the first image 10. The image quality information 1110 of the first image 10 may include information indicating that a grayscale is high, the number of objects is low, the number of colors is low, and an edge proportion is low.

The processor 110 according to an embodiment of the disclosure may match each image quality information item of the first image 10 to image quality information of a plurality of test images stored in the result data 610.

For example, the processor 110 may identify a sensitivity level mapped to a test image of grayscale "top", based on grayscale information of the first image 10. The processor 110 may identify that a sensitivity level of a grayscale item is "top".

For example, the processor 110 may identify a sensitivity level mapped to a test image of number of objects "bottom", based on number-of-objects information of the first image 10. The processor 110 may identify that a sensitivity level of a number-of-objects item is "top".

For example, the processor 110 may identify a sensitivity level mapped to a test image of number of colors "bottom", based on number-of-colors information of the first image 10. The processor 110 may identify that a sensitivity level of a number-of-colors item is "top".

For example, the processor 110 may identify a sensitivity level mapped to a test image of edge proportion "bottom", based on edge proportion information of the first image 10. The processor 110 may identify that a sensitivity level of an edge proportion item is "top".

The processor 110 according to an embodiment of the disclosure may determine the sensitivity level of the input image by combining sensitivity levels obtained for image quality information items. For example, the sensitivity levels obtained for the image quality information items are all "top", and thus, the processor 110 may determine a sensitivity level 1115 of the input image as "top".

In a same or similar manner, the processor 110 may analyze the second image 20 using the image analysis module 122 and obtain image quality information 1120 of the second image 20. The image quality information 1120 of the second image 20 may include information indicating that a grayscale is low, the number of objects is high, a color distribution is high, and an edge proportion is high. The processor 110 may identify that sensitivity levels of test images respectively corresponding to image quality information items of the second image 20 are all "bottom" and thus determine a sensitivity level 1125 of the input image as "bottom".

In the disclosure, four image quality information items are considered to adjust brightness of an input image, but the disclosure is not limited thereto. For example, there may be more than four or fewer than four image quality information items of an input image.

When the processor 110 uses the result data 610, a sensitivity test is performed for each image quality information item and a sensitivity level of an input image is determined by combining the sensitivity level of the image quality information items, and thus, the sensitivity test may be simplified.

Figure 12:
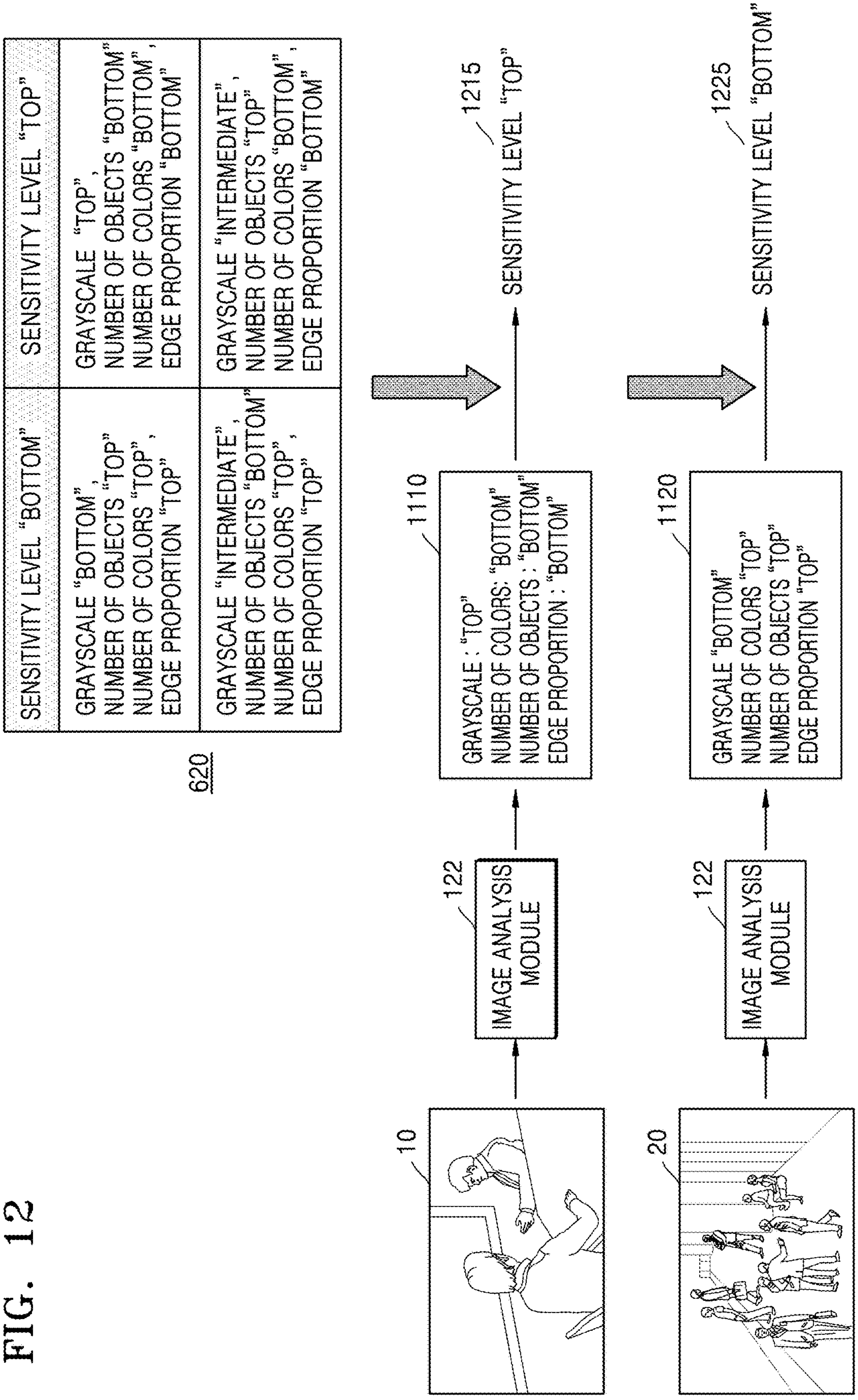
FIG. 12 is a diagram illustrating an example operation in which a display apparatus determines a sensitivity level for an input image using a sensitivity test result, according to various embodiments.

FIG. 12 is a diagram illustrating an example operation in which the display apparatus determines a sensitivity level for an input image using a sensitivity test result, according to various embodiments.

Referring to FIG. 12, an operation in which the processor 110 according to an embodiment of the disclosure determines a sensitivity level of an input image using the result data 620 will be described. The image quality information 1110 of the first image 10 and the image quality information 1120 of the second image 20 are same as those described with reference to FIG. 11.

The processor 110 according to an embodiment of the disclosure may match each image quality information item of the first image 10 to image quality information of at least one test image stored in the result data 620.

For example, the result data 620 may store the fifth test image in which the grayscale is low, the number of objects is high, the number of colors is high, and the edge proportion is high, wherein the image quality information of the fifth test image is mapped to a sensitivity level "bottom".

For example, the result data 620 may store the sixth test image in which the grayscale is high, the number of objects is low, the number of colors is low, and the edge proportion is low, wherein the image quality information of the sixth test image is mapped to a sensitivity level "top".

The processor 110 may identify the sixth test image, based on information indicating that the first image 10 has a high grayscale, a small number of objects, a small number of colors, and a low edge proportion, and identify a sensitivity level mapped to the sixth test image. The processor 110 may identify that the sensitivity level mapped to the sixth test image is "top" and determine a sensitivity level 1215 of the first image 10 as "top".

The processor 110 may identify the fifth test image, based on information indicating that the second image 20 has a low grayscale, a large number of objects, a large number of colors, and a high edge proportion, and identify a sensitivity level mapped to the fifth test image. Accordingly, the processor 110 may determine a sensitivity level 1225 of the second image 20 as "bottom".

In the disclosure, four image quality information items are considered to adjust brightness of an input image, but the disclosure is not limited thereto. For example, there may be more than four or fewer than four image quality information items of an input image.

When the processor 110 performs a sensitivity test on test images combined for each image quality information item and uses the result data 620, a sensitivity level for an input image may be determined using a sensitivity level for the image quality information that is matched to the input image in a one-to-one manner, and thus, a sensitivity tendency of the user may be further accurately reflected.

FIG. 13 is a flowchart illustrating an example method by which the display apparatus adjusts brightness of an input image according to intensity of a power saving mode, according to various embodiments. FIG. 14 includes tables illustrating results of the display apparatus adjusting the brightness of the input image according to the intensity of the power saving mode, according to various embodiments.

Referring to FIG. 13, in operation 1310, the processor 110 according to an embodiment of the disclosure may identify the power saving mode. When the power saving mode is turned on, the processor 110 may identify the intensity of the power saving mode.

For example, the processor 110 may receive a user input of setting the power saving mode. The user may set the display apparatus 100 to the power saving mode in at least one of first intensity, second intensity, or third intensity. For example, the first intensity may correspond to a strong power saving mode, the second intensity may correspond to an intermediate power saving mode, and the third intensity may correspond to a weak power saving mode.

The processor 110 according to an embodiment of the disclosure may identify a plurality of sensitivity levels according to image quality information items and determine a sensitivity level of the input image by combining the identified plurality of sensitivity levels. For example, the processor 110 may differently combine the plurality of sensitivity levels according to the intensity of the power saving mode.

In operations 1320 and 1350, when at least one item from among sensitivity levels of a plurality of image quality information items of the input image corresponds to "bottom" (YES), based on that the intensity of the power saving mode is the first intensity, the processor 110 may generate a driving signal for decreasing the brightness of the input image. For example, the processor 110 may determine the sensitivity level of the input image as "bottom".

In operations 1320 and 1360, when even at least one item from among the sensitivity levels of the plurality of image quality information items of the input image does not correspond to "bottom" (NO), based on that the intensity of the power saving mode is the first intensity, the processor 110 may generate a driving signal for maintaining the brightness of the input image. For example, the processor 110 may determine the sensitivity level of the input image as "top".

For example, in the strong power saving mode, when even at least one image quality information item has a low sensitivity level, the processor 110 may determine that the input image has the low sensitivity level and decrease the brightness of the input image. The processor 110 may use information indicating that a sensitivity level is "bottom" as an OR condition. The processor 110 may maximize and/or increase power consumption reduction.

For example, in a reference numeral 1410 of FIG. 14, the processor 110 may determine to decrease the brightness of the input image when at least one item from among a grayscale item of a test image, a number-of-objects item of the test image, a number-of-objects item of the test image, and an edge proportion item of the test image corresponds to "bottom".

For example, in Case 2 of the reference numeral 1410 of FIG. 14, the sensitivity level of the grayscale item is "bottom", and thus, the processor 110 may determine to decrease the brightness of the input image even if the sensitivity level of another image quality information item is "top".

In the strong power saving mode, when all items are sensitivity level "top", the processor 110 may not decrease the brightness because viewing experience deterioration of the user is expected as the user recognizes a brightness change in the input image.

For example, in Case 3 of the reference numeral 1410 of FIG. 14, the processor 110 may determine to maintain the brightness of the input image because sensitivity levels of all image quality information items are "top".

In operations 1330 and 1350, when a certain number of items from among the plurality of image quality information items of the input image have a low sensitivity level (YES), based on that the intensity of the power saving mode is the second intensity, the processor 110 according to an embodiment of the disclosure may generate the driving signal for decreasing the brightness of the input image. For example, the processor 110 may determine the sensitivity level of the input image as "bottom".

For example, the processor 110 may determine the sensitivity level of the input image as "bottom" when sensitivity levels of a certain number (e.g., 2 or 3) of image quality information items from among four image quality information items are low.

In operations 1340 and 1350, when the sensitivity levels of the plurality of image quality information items of the input image correspond to "bottom" (YES), based on that the intensity of the power saving mode is the third intensity, the processor 110 according to an embodiment of the disclosure may generate the driving signal for decreasing the brightness of the input image. For example, the processor 110 may determine the sensitivity level of the input image as "bottom".

In operations 1340 and 1360, when the sensitivity level of each of the plurality of image quality information items of the input image does not correspond to "bottom" (NO), based on that the intensity of the power saving mode is the third intensity, the processor 110 may generate the driving signal for maintaining the brightness of the input image. For example, the processor 110 may determine the sensitivity level of the input image as "top".

In the weak power saving mode, the processor 110 may decrease the brightness of the input image only when the sensitivity levels of all items are "bottom". The processor 110 may use information indicating that a sensitivity level is "bottom" as a AND condition.

For example, in a reference numeral 1420 of FIG. 14, the processor 110 may determine to decrease the brightness of the input image when a sensitivity level of each of a grayscale item of a test image, a number-of-objects item of the test image, a number-of-objects item of the test image, and an edge proportion item of the test image corresponds to "bottom".

For example, in Case 1 of the reference numeral 1420 of FIG. 14, the processor 110 may determine to decrease the brightness of the input image because sensitivity levels of all four items are "bottom".

In the weak power saving mode, the processor 110 may not decrease the brightness so as to minimize and/or reduce viewing experience deterioration of the user when even at least one item has sensitivity level "top".

For example, in Case 2 of the reference numeral 1420 of FIG. 14, the sensitivity level of the edge proportion item is "top", and thus, the processor 110 may determine to maintain the brightness of the input image even if the sensitivity level of another item is "bottom".

The display apparatus 100 according to an embodiment of the disclosure may combine a plurality of sensitivity levels by applying at least one of operation 1320, operation 1330, or operation 1340, regardless of the power saving mode.

Figure 15:
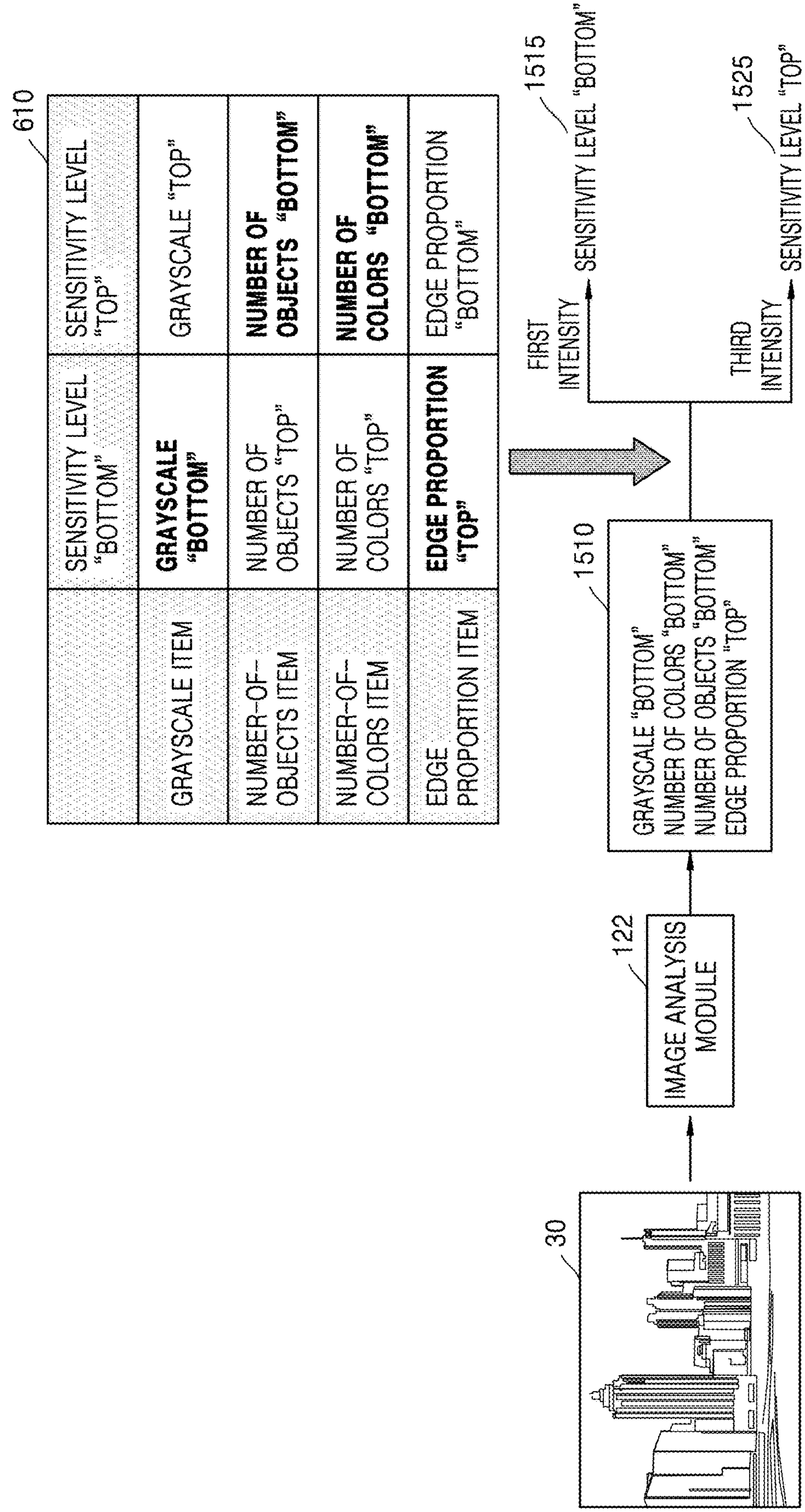
FIG. 15 is a diagram illustrating an example operation in which a display apparatus adjusts brightness of an input image according to intensity of a power saving mode, according to various embodiments.

FIG. 15 is a diagram illustrating an example operation in which the display apparatus adjusts brightness of an input image according to intensity of a power saving mode, according to various embodiments.

An operation in which the processor 110 according to an embodiment of the disclosure determines a sensitivity level of an input image by combining a plurality of sensitivity levels, based on the result data 610 will be described with reference to FIG. 15, in association with FIGS. 13 and 14.

For example, the processor 110 may analyze a third image 30 using the image analysis module 122 and obtain image quality information 1510 of the third image 30. The image quality information 1510 of the third image 30 may include information indicating that a grayscale is low, the number of objects is low, the number of colors is low, and an edge proportion is high.

The processor 110 according to an embodiment of the disclosure may match each image quality information item of the third image 30 to the image quality information of the plurality of test images stored in the result data 610.

For example, the processor 110 may identify that a sensitivity level of a test image of grayscale "bottom" is "bottom", based on grayscale information of the third image 30. For example, the processor 110 may identify that a sensitivity level of a test image of number of objects "bottom" is "top", based on number-of-objects information of the third image 30.

For example, the processor 110 may identify that a sensitivity level of a test image of number of colors "bottom" is "top", based on number-of-colors information of the third image 30.

For example, the processor 110 may identify that a sensitivity level of a test image of edge proportion "top" is "bottom", based on edge proportion information of the third image 30.

The processor 110 according to an embodiment of the disclosure may determine the sensitivity level of the input image by combining sensitivity levels obtained for image quality information items. For example, among the plurality of sensitivity levels obtained by the processor 110 for the image quality information items, two thereof may be "top" and the remaining two thereof may be "bottom".

For example, as described above with reference to FIGS. 13 and 14, when the power saving mode is the first intensity, the processor 110 may determine a sensitivity level 1515 of the input image as "bottom" when at least one item from among the sensitivity levels of the image quality information items is "bottom". The processor 110 may determine to decrease the brightness of the third image 30, based on the sensitivity level.

For example, as described above with reference to FIGS. 13 and 14, when the power saving mode is the third intensity, the processor 110 may determine a sensitivity level 1525 of the input image as "top" when all of the sensitivity levels of the image quality information items do not correspond to "bottom". The processor 110 may determine to maintain or less decrease the brightness of the third image 30, based on the sensitivity level.

FIG. 16A are diagrams illustrating examples of a PWM signal according to a dimming value, according to various embodiments.

Referring to FIG. 16A, the processor 110 according to an embodiment of the disclosure may control a light source through a PWM signal. The light source may include, for example, at least one of a backlight unit and a display including independently emitting pixels.

The PWM signal adjusts brightness by modulating a duty ratio or a length of a turn-on section. For example, the display apparatus 100 may increase or decrease brightness of an image by increasing or decreasing a duty ratio.

The duty ratio may indicate a ratio between the length of the turn-on section of the PWM signal and a period of the PWM signal. The brightness may increase when the duty ratio is increased, and the brightness may decrease when the duty ratio is decreased. For example, a duty ratio of a first signal 1610 may be lower than a duty ratio of a second signal 1620.

According to an embodiment of the disclosure, the PWM signal may be adjusted according to a dimming value. For example, when the dimming value is increased, the duty ratio of the PWM signal may be decreased. When the dimming value is decreased, the duty ratio of the PWM signal may be increased. For example, the first signal 1610 may be a PWM signal with a duty ratio corresponding to a first dimming value. For example, the second signal 1620 may be a PWM signal with a duty ratio corresponding to a second dimming value.

The processor 110 according to an embodiment of the disclosure includes information about a vertical synchronization signal (e.g., Vsyn) of a display, and thus may adjust a brightness of an image at frame intervals. A period of a driving signal generated by the processor 110 may correspond to an interval between frames output by the display. For example, when the display apparatus 100 displays an image at an operating frequency of 60 Hz, the interval between frames may be 16.6 ms and the period of the PWM signal may be 16.6 ms. Accordingly, the display apparatus 100 may generate a PWM signal in which a duty ratio is adjusted at frame intervals and operate the display through the PWM signal, thereby adjusting brightness per frame.

FIG. 16B are diagrams illustrating examples of a PAM signal according to a dimming value, according to various embodiments.

Referring to FIG. 16B, the processor 110 according to an embodiment of the disclosure may control a light source through a PAM signal.

The PAM signal adjusts brightness by modulating amplitude of a driving signal. For example, the display apparatus 100 may increase or decrease brightness of an image by increasing or decreasing an amplitude size pf a PAM signal.

When a size of amplitude is increased, brightness may be increased, and when a size of amplitude is decreased, brightness may be decreased. For example, a size of amplitude of a third signal 1630 may be smaller than a size of amplitude of a fourth signal 1640.

According to an embodiment of the disclosure, a PAM signal may be adjusted according to a dimming value. For example, amplitude of the PAM signal may be decreased when the dimming value is increased, and the amplitude of the PAM signal may be increased when the dimming value is decreased. For example, the third signal 1630 may be a PAM signal with a size of amplitude corresponding to a first dimming value. For example, the fourth signal 1640 may be a PAM signal with a size of amplitude corresponding to a second dimming value.

Figure 17:
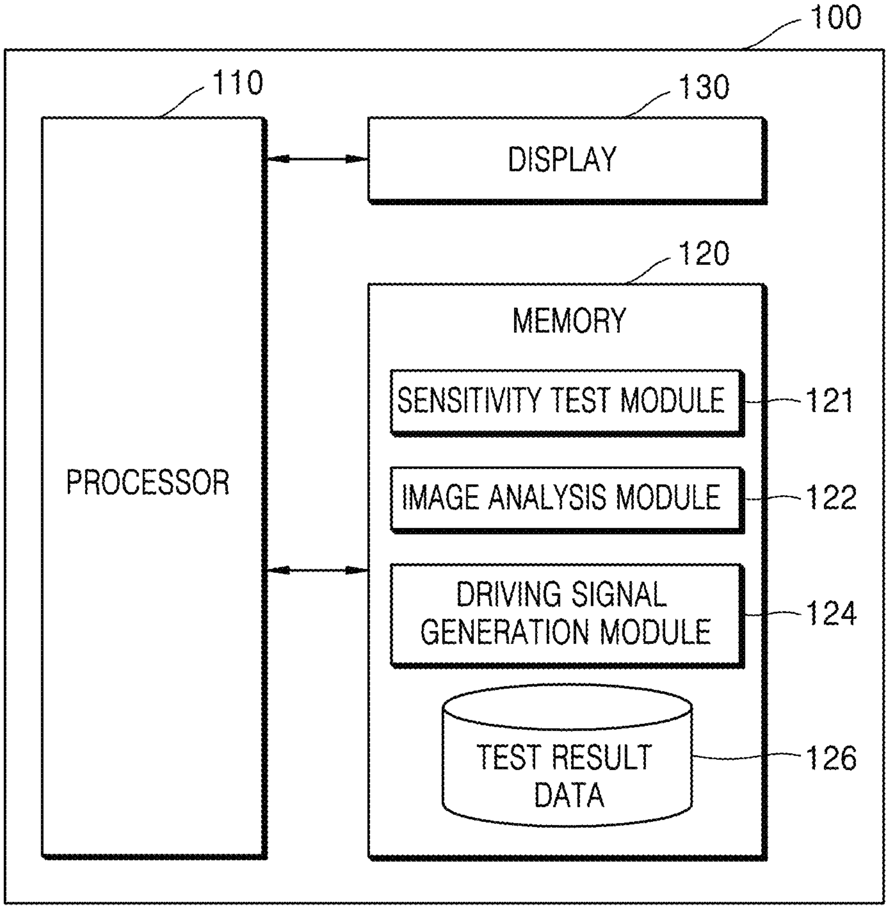
FIG. 17 is a block diagram illustrating an example configuration of a display apparatus according to various embodiments.

FIG. 17 is a block diagram illustrating an example configuration of the display apparatus according to various embodiments.

Referring to FIG. 17, the display apparatus 100 according to an embodiment of the disclosure may include the processor (e.g., including processing circuitry) 110, the memory 120, and a display 130. However, not all of the components shown are essential components. The display apparatus 100 may be implemented by more components than those illustrated or the display apparatus 100 may be implemented by fewer components than those illustrated.

The processor 110 may include various processing circuitry and is a component configured to control a series of processes for the display apparatus 100 to operate, and may include one or more processors. The one or more processors included in the processor 110 may be a circuitry such as a system on chip (SoC) or an integrated circuit (IC). The one or more processors included in the processor 110 may include a general-purpose processor, such as a central processing unit (CPU), a micro-processor unit (MPU), an application processor (AP), or a digital signal processor (DSP), a graphics dedicated processor, such as a graphics processing unit (GPU) or a vision processing unit (VPU), an artificial intelligence dedicated processor, such as a neural processing unit (NPU), or a communication dedicated processor, such as a communication processor (CP). When the one or more processors included in the processor 110 is an artificial intelligence dedicated processor, the artificial intelligence dedicated processor may be designed in a hardware structure specialized for processing of a specific artificial intelligence model. The processor 110 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

The processor 110 controls general operations of the display apparatus 100. For example, the processor 110 may control the display 130. For example, the processor 110 may execute at least one instruction of a program stored in the memory 120 to control general operations for performing dimming control by analyzing image quality information of an image.

The processor 110 may record data on the memory 120 or read data stored in the memory 120, and for example, may execute at least one instruction or a program stored in the memory 120 to process data according to a pre-defined operating rule or an artificial intelligence model. Accordingly, the processor 110 may perform operations of the display apparatus 100, and unless specifically described, it may be deemed that operations described to be performed by the display apparatus 100 or components included in the display apparatus 100 may be performed by the processor 110.

The memory 120 includes a component storing various programs or data, and may include a storage medium, such as read-only memory (ROM), random access memory (RAM), flash memory type memory, hard disk type memory, multimedia card micro type memory, or card type memory (e.g., a secure digital (SD) memory or an extreme digital (XD) memory), or a combination of storage media. The memory 120 may not be present separately but may be included in the processor 110. The memory 120 may be configured in a volatile memory, a nonvolatile memory, or a combination of a volatile memory and a nonvolatile memory. The memory 120 may store at least one program or at least one instruction executed by the processor 110. The memory 120 may provide stored data to the processor 110 according to a request of the processor 110.

The memory 120 according to an embodiment of the disclosure may store at least one instruction and/or program causing the display apparatus 100 to analyze image quality information of an image and perform dimming control. For example, the memory 120 may store a sensitivity test module 121, the image analysis module 122, a driving signal generation module 124, and result data 126 according to a sensitivity test. The image analysis module 122 may include at least one artificial intelligence model pre-trained by an external server and distributed to the display apparatus 100. Each of the modules may include executable program instructions executable by/on various circuitry.

The processor 110 according to an embodiment of the disclosure may execute the sensitivity test module 121 to perform a sensitivity test on a test image. The processor 110 may obtain the result data 126 through the sensitivity test. The sensitivity test has been described with reference to FIG. 2. The result data 126 has been described with reference to FIG. 6.

The processor 110 according to an embodiment of the disclosure may execute the image analysis module 122 to obtain image quality information about an input image. For example, the processor 110 may obtain at least one of grayscale information, number-of-objects information, number-of-colors information, or edge proportion information of the input image.

For example, the processor 110 may obtain grayscale information of an image, based on a signal of the input image. The processor 110 may obtain the grayscale information of the image by applying an RGB signal of the image to a well-known algorithm. For example, the grayscale information may correspond to a brightness value, a grayscale value, an average value of the RGB signal, or a V of an HSV signal obtained by converting the RGB signal.

For example, the processor 110 may obtain the number-of-objects information from the input image through an object information detection model. This has been described with reference to FIG. 8.

For example, the processor 110 may extract a color distribution histogram of the input image through a color distribution histogram extraction module and obtain the number-of-colors information of the input image. This has been described with reference to FIG. 9.

For example, the processor 110 may extract an edge component of the input image through an edge component detection module and obtain the edge proportion information of the input image. This has been described with reference to FIG. 10.

For example, the processor 110 may generate a driving signal for adjusting brightness of the input image through the driving signal generation module 124. The processor 110 may determine a sensitivity level for the input image, based on the result data 126 and the image quality information of the input image obtained through the image analysis module 122, and generate the driving signal according to the sensitivity level. For example, the processor 110 may identify a test image having image quality information corresponding to the image quality information of the input image, and identify a sensitivity level for the test image. The processor 110 may determine the sensitivity level for the input image, based on the sensitivity level for the test image. When the sensitivity level for the input image is low, the processor 110 may generate the driving signal including a first dimming value for decreasing the brightness of the input image. When the sensitivity level for the input image is high, the processor 110 may generate the driving signal including a second dimming value for maintaining the brightness of the input image. The processor 110 may control the display 130 through the generated driving signal.

According to an embodiment of the disclosure, the processor 110 may differently adjust a dimming value according to a luminous environment. For example, when luminous intensity at a first point when the sensitivity test is performed and luminous intensity at a second point when the input image is output on the display 130 are different from each other, a dimming value at the second point may be increased or decreased in consideration of the luminous intensity at the first point. For example, when the luminous intensity at the second point is greater than the luminous intensity at the first point, the processor 110 may further decrease the brightness of the input image by further increasing the dimming value. For example, the processor 110 may assign a weight to the dimming value or change the dimming value (e.g., increase the dimming value by 10%) by a luminous intensity change amount (e.g., decrease luminous intensity by 10%).

When the sensitivity test is performed in a dark luminous environment, the user may be more sensitive to a brightness change, and thus, the processor 110 may determine a sensitivity level of the user to be higher than an actual sensitivity level. Accordingly, the processor 110 may generate a driving signal including a stronger dimming value than the dimming value corresponding to the determined sensitivity level when the input image is viewed in a bright luminous environment.

According to an embodiment of the disclosure, the processor 110 may operate based on an account. For example, the processor 110 may perform the sensitivity test for each user with an account registered in the display apparatus 100, and store a test result for each user. The processor 110 may identify a user account being currently executed and determine whether to adjust the brightness of the input image using a test result stored in the identified user account. The processor 110 may not adjust the brightness of the input image when a user who performed the sensitivity test and a current user are different.

The display 130 may, for example and without limitation, include at least one of a liquid crystal display (LCD), a thin-film transistor-liquid crystal display, a light-emitting diode (LED), an organic light-emitting diode (OLED), a micro LED, a flexible display, a 3-dimensional (3D) display, an electrophoretic display, or the like.

When the display 130 according to an embodiment of the disclosure includes a backlight unit, the processor 110 may control the backlight unit through a driving signal. The driving signal may correspond to a backlight driving signal for controlling the backlight unit. The backlight unit includes a plurality of LEDs and may emit light according to supply of a current. For example, the processor 110 may adjust an amount of current supplied to the backlight unit, based on a driving signal. When a dimming value is increased, the amount of current supplied to the backlight unit is decreased and intensity of light generated by the backlight unit is decreased, and thus, brightness of an image may be decreased.

When the display 130 according to an embodiment of the disclosure includes a display panel in which pixels independently emit light, the processor 110 may adjust an amount of current applied to the pixels included in the display panel, based on a driving signal. The driving signal may be a signal for adjusting the amount of current applied to the pixels included in the display panel. When a dimming value is increased, the amount of current supplied to the pixels is decreased and intensity of light generated by the pixel is decreased, and thus, brightness of an image may be decreased.

The display 130 according to an embodiment of the disclosure may receive a driving signal from the processor 110. For example, the display 130 may receive, from the processor 110, a driving signal including a first dimming value for outputting an input image with a low sensitivity level. Upon receiving the driving signal including the first dimming value, the display 130 may decrease brightness of an image displayed on the display 130. Alternatively, for example, the display 130 may receive, from the processor 110, a driving signal including a second dimming value for outputting an input image with a high sensitivity level. Upon receiving the driving signal including the second dimming value, the display 130 may maintain brightness of an image displayed on the display 130.

Figure 18:
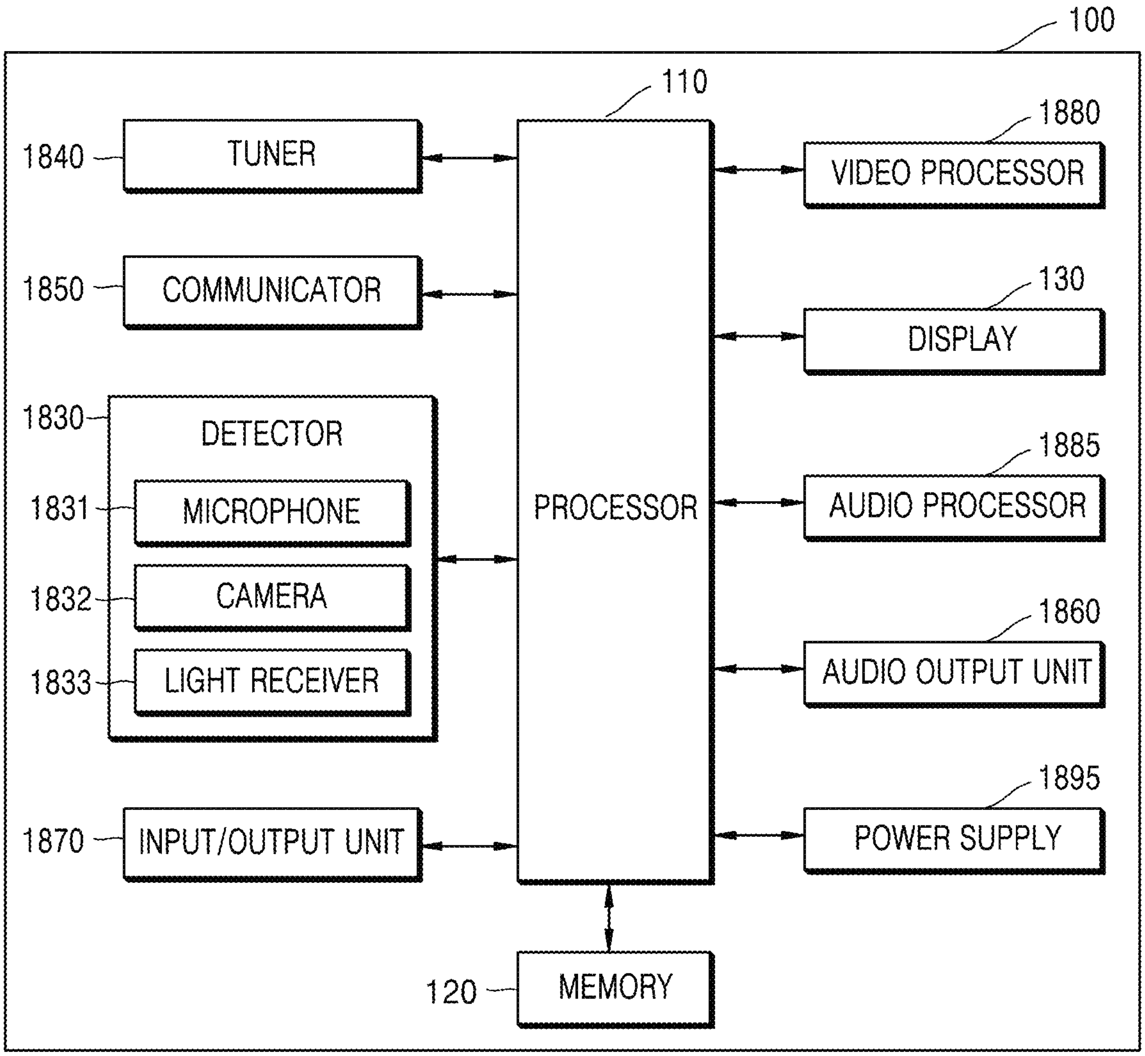
FIG. 18 is a block diagram illustrating an example configuration of a display apparatus according to various embodiments.

FIG. 18 is a block diagram illustrating an example configuration of the display apparatus according to various embodiments.

Referring to FIG. 18, the display apparatus 100 may include a tuner 1840, the processor (e.g., including processing circuitry) 110, the display 130, a communicator (e.g., including communication circuitry) 1850, a detector (e.g., including various circuitry) 1830, an input/output unit (e.g., including input/output circuitry) 1870, a video processor (e.g., including video processing circuitry) 1880, an audio processor (e.g., including audio processing circuitry) 1885, an audio output unit (e.g., including audio output circuitry) 1860, the memory 120, and a power supply 1895.

The tuner 1840 according to an embodiment of the disclosure may tune and select only a frequency of a channel to be received by the display apparatus 100 among many radio wave components by performing amplification, mixing, and resonance on a broadcast signal received via wires or wirelessly. The broadcast signal includes audio, video, and additional information (for example, an electronic program guide (EPG)).

The tuner 1840 may receive a broadcast signal from various sources, such as terrestrial broadcasting, cable broadcasting, satellite broadcasting, and Internet broadcasting. The tuner 1840 may receive a broadcast signal from a source such as analog broadcasting or digital broadcasting.

The communicator 1850 may include various communication circuitry and transmit and receive data or a signal to and from an external device or a server. For example, the communicator 1850 may include a Wi-Fi module, a Bluetooth module, an infrared communication module, a wireless communication module, a local area network (LAN) module, an Ethernet module, or a wired communication module. Here, each communication module may be implemented in the form of at least one hardware chip.

The Wi-Fi module and the Bluetooth module may communicate through a W-Fi method and a Bluetooth method, respectively. When the Wi-Fi module or the Bluetooth module is used, various types of connection information, such as a service set identifier (SSID) or a session key, may be transmitted or received first, communication may be connected using the same, and then various types of information may be transmitted or received. The wireless communication module may include at least one communication chip performing communication according to various wireless communication standards, such as ZigBee, 3rd generation (3G), 3G partnership project (3GPP), long-term evolution (LTE), LTE advanced (LTE-A), 4th generation (4G), and 5th generation (5G).

The detector 1830 according to an embodiment of the disclosure may include various circuitry and detect a speech of a user, an image of the user, or an interaction of the user, and may include a microphone 1831, a camera 1832, and a light receiver 1833.

The microphone 1831 receives a speech uttered by the user. The microphone 1831 may convert the received speech into an electric signal and output the electric signal to the processor 110.

The light receiver 1833 receives an optical signal (including a control signal) received from an external control device via a light window (not shown) of a bezel of the display 130. The light receiver 1833 may receive an optical signal corresponding to a user input (for example, touch, press, touch gesture, speech, or motion) from a control device. A control signal may be extracted from the received light signal under control by the processor 110.

The input/output unit 1870 according to an embodiment of the disclosure may include various input/output circuitry and receive video (e.g., a moving image), audio (e.g., speech or music), and additional information (e.g., electronic program guide (EPG)) from the outside of the display apparatus 100. The input/output unit 1870 may include any one of a high-definition multimedia interface (HDMI), a mobile high-definition link (MHL), a universal serial bus (USB), a display port (DP), a thunderbolt, a video graphics array (VGA) port, an RGB port, a D-subminiature (D-SUB), a digital visual interface (DVI), a component jack, and a PC port.

The video processor 1880 according to an embodiment of the disclosure may include various video processing circuitry and performs processing on video data received by the display apparatus 100. The video processor 1880 may perform various image processes, such as decoding, scaling, noise cancelling, frame rate converting, and resolution converting, on the video data.

The processor 110 may include at least one of a CPU, a GPU, or a VPU. According to an embodiment of the disclosure, the processor 110 may be implemented in the form of a SoC in which at least one of CPU, GPU, or VPU is integrated. Alternatively, the processor 110 may further include an NPU. The processor is described in greater detail above at least with reference to FIG. 17.

The memory 120 according to an embodiment of the disclosure may store various types of data, programs, or applications for driving and controlling the display apparatus 100.

The program stored in the memory 120 may include one or more instructions. The program (one or more instructions) or application stored in the memory 120 may be executed by the processor 110.

The processor 110 according to an embodiment of the disclosure may execute the one or more instructions stored in the memory 120 to obtain an image. The image may be an image pre-stored in the memory 120 or an image received from an external device through the tuner 1840 or the communicator 1850. Also, the image may be an image on which various types of image processes have been performed by the video processor 1880, such as decoding, scaling, noise cancelling, frame rate conversion, resolution conversion, and the like.

The display 130 according to an embodiment of the disclosure may generate a driving signal by converting an image signal, a data signal, an on-screen display (OSD) signal, or a control signal processed by the processor 110.

The audio processor 1885 may include various audio processing circuitry and performs a process on audio data. The audio processor 1885 may perform various processes, such as decoding, amplification, or noise filtering, on the audio data. The audio processor 1885 may include a plurality of audio processing modules to process audio corresponding to a plurality of pieces of content.

The audio output unit 1860 may include various audio output circuitry and outputs audio included in a broadcast signal received via the tuner 1840 under control by the processor 110. The audio output unit 1860 may output the audio (for example, speech or sound) input via the communicator 1850 or the input/output unit 1870. Also, the audio output unit 1860 may output audio stored in the memory 120 under control by the processor 110. The audio output unit 1860 may include at least one of a speaker, a headphone output terminal, or a Sony/Philips digital interface (S/PDIF) terminal.

The power supply 1895 supplies power input from an external power source to components inside the display apparatus 100 under control by the processor 110. Also, the power supply 1895 may supply power output from one or more batteries (not shown) located inside the display apparatus 100 to the components inside the display apparatus 100 under control by the processor 110.

The processor 110 according to an embodiment of the disclosure may execute the one or more instructions stored in the memory 120 to store, in the memory 120, image quality information about one or more test images and a sensitivity level indicating sensitivity of a user to a brightness change in the one or more test images. When referring to the processor 110 executing one or more instructions, it may be understood that the processor may be configured to perform the recited operations in any manner including, but not limited to, executing instructions.

The processor 110 according to an embodiment of the disclosure may execute the one or more instructions stored in the memory 120 to obtain an input image and image quality information about the input image.

The processor 110 according to an embodiment of the disclosure may execute the one or more instructions stored in the memory 120 to identify whether the image quality information about the input image corresponds to image quality information about at least one test image.

The processor 110 according to an embodiment of the disclosure may execute the one or more instructions stored in the memory 120 to, based on that the image quality information about the input image corresponds to the image quality information about the at least one test image, generate a driving signal for adjusting brightness of the input image, based on a sensitivity level for the at least one test image.

The processor 110 according to an embodiment of the disclosure may execute the one or more instructions stored in the memory 120 to control the display 130 through the generated driving signal.

The memory 120 according to an embodiment of the disclosure may store result data in which image quality information about a test image in which the brightness change is not recognizable is mapped to information indicating that a sensitivity level is low, and image quality information about a test image in which the brightness change is recognizable is mapped to information indicating that a sensitivity level is high.

The image quality information about the input image, according to an embodiment of the disclosure, may include at least one of grayscale information, number-of-objects information, number-of-colors information, or edge proportion information of the input image.

The processor 110 according to an embodiment of the disclosure may execute the one or more instructions stored in the memory 120 to, based on that the at least one test image corresponding to the input image corresponds to a first level corresponding to a low sensitivity level, generate the driving signal including a first dimming value for decreasing brightness of the input image.

The processor 110 according to an embodiment of the disclosure may execute the one or more instructions stored in the memory 120 to, based on that the at least one test image corresponding to the input image corresponds to a second level corresponding to a high sensitivity level, generate the driving signal including a second dimming value smaller than the first dimming value.

The driving signal according to an embodiment of the disclosure may include at least one of a PWM signal or a PAM signal. When the driving signal includes the PWM signal, a PWM duty ratio corresponding to the first dimming value may be smaller than a PWM duty ratio corresponding to the second dimming value. When the driving signal includes the PAM signal, a PAM amplitude size corresponding to the first dimming value may be smaller than a PAM amplitude size corresponding to the second dimming value.

The processor 110 according to an embodiment of the disclosure may determine the sensitivity level of the input image by combining sensitivity levels of a plurality of test images by individually testing image quality information items.

The processor 110 according to an embodiment of the disclosure may execute the one or more instructions stored in the memory 120 to store, in the memory 120, a sensitivity level for each of a plurality of test images classified for each of a plurality of image quality information items.

The processor 110 according to an embodiment of the disclosure may execute the one or more instructions stored in the memory 120 to identify, for each of the plurality of image quality information items of the input image, whether the image quality information of the input image corresponds to image quality information of each of the plurality of test images.

The processor 110 according to an embodiment of the disclosure may execute the one or more instructions stored in the memory 120 to identify a plurality of sensitivity levels respectively for pieces of the image quality information of the plurality of test images corresponding to the image quality information of the input image.

The processor 110 according to an embodiment of the disclosure may execute the one or more instructions stored in the memory 120 to generate the driving signal for adjusting the brightness of the input image by combining the identified plurality of sensitivity levels.

The processor 110 according to an embodiment of the disclosure may execute the one or more instructions stored in the memory 120 to store at least one of a sensitivity level for a first test image including grayscale information, a sensitivity level for a second test image including number-of-objects information, a sensitivity level for a third test image including number-of-colors information, or a sensitivity level for a fourth test image including edge proportion information.

The processor 110 according to an embodiment of the disclosure may execute the one or more instructions stored in the memory 120 to identify whether at least one of the grayscale information, the number-of-objects information, the number-of-colors information, or the edge proportion information of the input image corresponds to at least one of the grayscale information of the first test image, the number-of-objects information of the second test image, the number-of-colors information of the third test image, or the edge proportion information of the fourth test image.

The processor 110 according to an embodiment of the disclosure may execute the one or more instructions stored in the memory 120 to, based on that the input image corresponds to at least one of the first test image, the second test image, the third test image, or the fourth test image, identify a sensitivity level for at least one of the first test image, the second test image, the third test image, or the fourth test image.

The processor 110 according to an embodiment of the disclosure may execute the one or more instructions stored in the memory 120 to generate the driving signal for adjusting the brightness of the input image, based on the identified sensitivity level.

The processor 110 according to an embodiment of the disclosure may differently combine the sensitivity levels according to intensity of a power saving mode.

The processor 110 according to an embodiment of the disclosure may execute the one or more instructions stored in the memory 120 to, based on that intensity of a power saving mode is first intensity, generate the driving signal for decreasing the brightness of the input image when a sensitivity level of at least one item from among the plurality of image quality information items of the input image is low.

The processor 110 according to an embodiment of the disclosure may execute the one or more instructions stored in the memory 120 to, based on that the intensity of the power saving mode is second intensity lower than the first intensity, generate the driving signal for decreasing the brightness of the input image when a sensitivity level of a specific number of items from among the plurality of image quality information items of the input image is low.

The processor 110 according to an embodiment of the disclosure may execute the one or more instructions stored in the memory 120 to, based on that the intensity of the power saving mode is third intensity lower than the second intensity, generate the driving signal for decreasing the brightness of the input image when a sensitivity level of each of the plurality of image quality information items of the input image is low.

The processor 110 according to an embodiment of the disclosure may perform a sensitivity test on the one or more test images.

The processor 110 according to an embodiment of the disclosure may execute the one or more instructions stored in the memory 120 to control the display 130 to output the one or more test images by decreasing brightness thereof.

The processor 110 according to an embodiment of the disclosure may execute the one or more instructions stored in the memory 120 to output a graphical user interface inquiring whether the brightness change in the one or more test images is recognizable.

The processor 110 according to an embodiment of the disclosure may execute the one or more instructions stored in the memory 120 to, based on a user input related to whether the brightness change is recognizable, obtain the sensitivity level for the one or more test images.

The processor 110 according to an embodiment of the disclosure may execute the one or more instructions stored in the memory 120 to generate the driving signal including a defined dimming value at regular time intervals to decrease the brightness of the one or more test images by a defined amount at regular time intervals.

The processor 110 according to an embodiment of the disclosure may execute the one or more instructions stored in the memory 120 to perform at least one of, based on a user input corresponding to unrecognition of the brightness change in the one or more test images, obtaining the first level corresponding to the low sensitivity level for the one or more test images, or based on a user input corresponding to recognition of the brightness change in the one or more test images, obtaining the second level corresponding to the high sensitivity level for the one or more test images.

The processor 110 according to an embodiment of the disclosure may execute the one or more instructions stored in the memory 120 to, based on the user input corresponding to the recognition of the brightness change in the one or more test images, perform a retest on the one or more test images by decreasing a brightness change amount or decreasing a brightness change speed.

A method of operating the display apparatus, according to an example embodiment of the disclosure, includes: storing, in the memory, image quality information about one or more test images and a sensitivity level indicating sensitivity of a user to a brightness change in the one or more test images, obtaining an input image and image quality information about the input image, identifying whether the image quality information about the input image corresponds to image quality information about at least one test image, based on the image quality information about the input image corresponding to the image quality information about the at least one test image, generating a driving signal for adjusting brightness of the input image, based on a sensitivity level for the at least one test image, controlling the display through the generated driving signal.

The generating of the driving signal, according to an example embodiment of the disclosure, may include, based on the at least one test image corresponding to the input image corresponding to a first level corresponding to a low sensitivity level, generating the driving signal including a first dimming value for decreasing brightness of the input image, and based on the at least one test image corresponding to the input image corresponding to a second level corresponding to a high sensitivity level, generating the driving signal including a second dimming value smaller than the first dimming value.

The storing according to an example embodiment of the disclosure may include storing, in the memory 120, a sensitivity level for each of a plurality of test images classified for each of a plurality of image quality information items.

The identifying according to an example embodiment of the disclosure may include identifying, for each of the plurality of image quality information items of the input image, whether the image quality information of the input image corresponds to image quality information of each of the plurality of test images.

The generating of the driving signal, according to an example embodiment of the disclosure, may include identifying a plurality of sensitivity levels respectively for pieces of the image quality information of the plurality of test images corresponding to the image quality information of the input image, and generating the driving signal for adjusting the brightness of the input image by combining the identified plurality of sensitivity levels.

The generating of the driving signal for adjusting the brightness of the input image by combining the identified plurality of sensitivity levels, according to an example embodiment of the disclosure, may include at least one of, based on an intensity of a power saving mode being a first intensity, generating the driving signal for decreasing the brightness of the input image when a sensitivity level of at least one item from among the plurality of image quality information items of the input image is low, based on the intensity of the power saving mode being a second intensity lower than the first intensity, generating the driving signal for decreasing the brightness of the input image based on a sensitivity level of a specific number of items from among the plurality of image quality information items of the input image being low, or based on the intensity of the power saving mode being a third intensity lower than the second intensity, generating the driving signal for decreasing the brightness of the input image based on a sensitivity level of each of the plurality of image quality information items of the input image being low.

The method may further include performing a sensitivity test for the one or more test images.

The performing of the sensitivity test may include: controlling the display to output the one or more test images by decreasing brightness thereof, outputting a graphical user interface inquiring whether the brightness change in the one or more test images is recognizable, and based on a user input related to whether the brightness change is recognizable, obtaining the sensitivity level for the one or more test images.

A machine-readable storage medium may be provided in the form of a non-transitory storage medium. The "non-transitory storage medium" merely denotes a tangible device and may not contain a signal (for example, electromagnetic waves). This term does not distinguish a case where data is stored in the storage medium semi-permanently and a case where the data is stored in the storage medium temporarily. For example, the "non-transitory storage medium" may include a buffer where data is temporarily stored.

According to an embodiment of the disclosure, a method according to an embodiment of the disclosure disclosed in the present disclosure may be provided by being included in a computer program product. The computer program products are products that can be traded between sellers and buyers. The computer program product may be distributed in the form of machine-readable storage medium (for example, a compact disc read-only memory (CD-ROM)), or distributed (for example, downloaded or uploaded) through an application store or directly or online between two user devices (for example, smart phones). In the case of online distribution, at least a part of the computer program product (for example, a downloadable application) may be at least temporarily generated or temporarily stored in a machine-readable storage medium, such as a server of a manufacturer, a server of an application store, or memory of a relay server.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A display apparatus comprising:

a display;

memory storing one or more instructions; and at least one processor, comprising processing circuitry, individually and/or collectively, configured to execute the one or more instructions stored in the memory and to:

store, in the memory, image quality information about one or more test images and a sensitivity level indicating sensitivity of a user to a brightness change in the one or more test images;

obtain an input image and image quality information about the input image;

identify whether the image quality information about the input image corresponds to image quality information about at least one test image;

based on the image quality information about the input image corresponding to the image quality information about the at least one test image, generate a driving signal for adjusting brightness of the input image, based on a sensitivity level for the at least one test image; and control the display through the generated driving signal.

2. The display apparatus of claim 1, wherein result data in which image quality information about a test image in which the brightness change is not recognizable is mapped to information indicating that a sensitivity level is low, and result data in which image quality information about a test image in which the brightness change is recognizable is mapped to information indicating that a sensitivity level is high are stored in the memory.

3. The display apparatus of claim 1, wherein the image quality information about the input image comprises at least one of grayscale information, number-of-objects information, number-of-colors information, or edge proportion information of the input image.

4. The display apparatus of claim 1, wherein at least one processor, individually and/or collectively, is configured to:

based on the at least one test image corresponding to the input image corresponding to a first level corresponding to a low sensitivity level, generate the driving signal including a first dimming value for decreasing brightness of the input image; and based on the at least one test image corresponding to the input image corresponding to a second level corresponding to a high sensitivity level, generate the driving signal including a second dimming value smaller than the first dimming value.

5. The display apparatus of claim 4, wherein the driving signal comprises at least one of a pulse width modulation (PWM) signal or a pulse amplitude modulation (PAM) signal, based on the driving signal comprising the PWM signal, a PWM duty ratio corresponding to the first dimming value is smaller than a PWM duty ratio corresponding to the second dimming value, and based on the driving signal comprising the PAM signal, a PAM amplitude size corresponding to the first dimming value is smaller than a PAM amplitude size corresponding to the second dimming value.

6. The display apparatus of claim 1, wherein at least one processor, individually and/or collectively, is configured to:

store, in the memory, a sensitivity level for each of a plurality of test images classified for each of a plurality of image quality information items;

identify, for each of the plurality of image quality information items of the input image, whether the image quality information of the input image corresponds to image quality information of each of the plurality of test images;

identify a plurality of sensitivity levels respectively for pieces of the image quality information of the plurality of test images corresponding to the image quality information of the input image; and generate the driving signal for adjusting the brightness of the input image by combining the identified plurality of sensitivity levels.

7. The display apparatus of claim 6, wherein at least one processor, individually and/or collectively, is configured to:

store at least one of a sensitivity level for a first test image including grayscale information, a sensitivity level for a second test image including number-of-objects information, a sensitivity level for a third test image including number-of-colors information, or a sensitivity level for a fourth test image including edge proportion information;

identify whether at least one of the grayscale information, the number-of-objects information, the number-of-colors information, or the edge proportion information of the input image corresponds to at least one of the grayscale information of the first test image, the number-of-objects information of the second test image, the number-of-colors information of the third test image, or the edge proportion information of the fourth test image;

based on the input image corresponding to at least one of the first test image, the second test image, the third test image, or the fourth test image, identify a sensitivity level for at least one of the first test image, the second test image, the third test image, or the fourth test image; and generate the driving signal for adjusting the brightness of the input image, based on the identified sensitivity level.

8. The display apparatus of claim 6, wherein at least one processor, individually and/or collectively, is configured to:

based on an intensity of a power saving mode being a first intensity, generate the driving signal for decreasing the brightness of the input image based on a sensitivity level of at least one item from among the plurality of image quality information items of the input image being low;

based on the intensity of the power saving mode being a second intensity lower than the first intensity, generate the driving signal for decreasing the brightness of the input image based on a sensitivity level of a specific number of items from among the plurality of image quality information items of the input image being low; and based on the intensity of the power saving mode being a third intensity lower than the second intensity, generate the driving signal for decreasing the brightness of the input image based on a sensitivity level of each of the plurality of image quality information items of the input image being low.

9. The display apparatus of claim 1, wherein at least one processor, individually and/or collectively, is configured to:

control the display to output the one or more test images by decreasing brightness of the one or more test images;

output a graphical user interface inquiring whether the brightness change in the one or more test images is recognizable;

based on a user input related to whether the brightness change is recognizable, obtain the sensitivity level for the one or more test images; and perform a sensitivity test for the one or more test images.

10. The display apparatus of claim 9, wherein at least one processor, individually and/or collectively, is configured to generate the driving signal including a defined dimming value at regular time intervals to decrease the brightness of the one or more test images by a defined amount at regular time intervals.

11. The display apparatus of claim 9, wherein at least one processor, individually and/or collectively, is configured to perform at least one of:

based on a user input corresponding to unrecognition of the brightness change in the one or more test images, obtaining the first level corresponding to the low sensitivity level for the one or more test images; or based on a user input corresponding to recognition of the brightness change in the one or more test images, obtaining the second level corresponding to the high sensitivity level for the one or more test images.

12. The display apparatus of claim 9, wherein at least one processor, individually and/or collectively, is configured to, based on the user input corresponding to the recognition of the brightness change in the one or more test images, perform a retest on the one or more test images by decreasing a brightness change amount or decreasing a brightness change speed.

13. A method of operating a display apparatus, the method comprising:

storing, in memory, image quality information about one or more test images and a sensitivity level indicating sensitivity of a user to a brightness change in the one or more test images;

obtaining an input image and image quality information about the input image;

identifying whether the image quality information about the input image corresponds to image quality information about at least one test image;

based on the image quality information about the input image corresponding to the image quality information about the at least one test image, generating a driving signal for adjusting brightness of the input image, based on a sensitivity level for the at least one test image; and controlling a display through the generated driving signal.

14. The method of claim 13, wherein result data in which image quality information about a test image in which the brightness change is not recognizable is mapped to information indicating that a sensitivity level is low, and result data in which image quality information about a test image in which the brightness change is recognizable is mapped to information indicating that a sensitivity level is high are stored in the memory.

15. The method of claim 13, wherein the image quality information about the input image comprises at least one of grayscale information, number-of-objects information, number-of-colors information, or edge proportion information of the input image.

16. The method of claim 13, wherein the generating of the driving signal comprises:

based on the at least one test image corresponding to the input image corresponding to a first level corresponding to a low sensitivity level, generating the driving signal including a first dimming value for decreasing brightness of the input image; and based on the at least one test image corresponding to the input image corresponding to a second level corresponding to a high sensitivity level, generating the driving signal including a second dimming value smaller than the first dimming value.

17. The method of claim 13, wherein the storing comprises storing, in the memory, a sensitivity level for each of a plurality of test images classified for each of a plurality of image quality information items, the identifying comprises identifying, for each of the plurality of image quality information items of the input image, whether the image quality information of the input image corresponds to image quality information of each of the plurality of test images, and the generating of the driving signal comprises:

identifying a plurality of sensitivity levels respectively for pieces of the image quality information of the plurality of test images corresponding to the image quality information of the input image; and generating the driving signal for adjusting the brightness of the input image by combining the identified plurality of sensitivity levels.

18. The method of claim 17, wherein the generating of the driving signal for adjusting the brightness of the input image by combining the identified plurality of sensitivity levels comprises at least one of:

based on an intensity of a power saving mode being a first intensity, generating the driving signal for decreasing the brightness of the input image based on a sensitivity level of at least one item from among the plurality of image quality information items of the input image being low;

based on the intensity of the power saving mode being a second intensity lower than the first intensity, generating the driving signal for decreasing the brightness of the input image based on a sensitivity level of a specific number of items from among the plurality of image quality information items of the input image being low; or based on the intensity of the power saving mode being a third intensity lower than the second intensity, generating the driving signal for decreasing the brightness of the input image based on a sensitivity level of each of the plurality of image quality information items of the input image being low.

19. The method of claim 13, further comprising performing a sensitivity test for the one or more test images, wherein the performing of the sensitivity test comprises:

controlling the display to output the one or more test images by decreasing brightness of the one or more test images;

outputting a graphical user interface inquiring whether the brightness change in the one or more test images is recognizable; and based on a user input related to whether the brightness change is recognizable, obtaining the sensitivity level for the one or more test images.

20. A non-transitory computer-readable recording medium having recorded thereon a program which, when executed on a computer, causes an electronic device to perform the method of claim 13.

* * * * *